United States Patent
Sudo et al.

(10) Patent No.: US 6,798,390 B1
(45) Date of Patent: *Sep. 28, 2004

(54) 3D IMAGE RECONSTRUCTING APPARATUS AND 3D OBJECT INPUTTING APPARATUS

(75) Inventors: Toshiyuki Sudo, Kawasaki (JP); Tsutomu Osaka, Kawasaki (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/040,273

(22) Filed: Mar. 18, 1998

(30) Foreign Application Priority Data

Aug. 29, 1997 (JP) .............................................. 9-249370
Dec. 10, 1997 (JP) .............................................. 9-361956

(51) Int. Cl.[7] ................................................ G09G 5/00
(52) U.S. Cl. .............................. 345/7; 345/8; 345/418; 345/419; 359/630; 359/631
(58) Field of Search .............................. 345/419, 420, 345/421, 422, 423–427, 7–9, 51, 52, 4, 5, 6, 32; 359/630, 631

(56) References Cited

U.S. PATENT DOCUMENTS

| 4,367,486 A | | 1/1983 | Eichenlaub | |
|---|---|---|---|---|
| 5,056,912 A | * | 10/1991 | Hamada et al. | 359/456 |
| 5,132,839 A | * | 7/1992 | Travis | 359/462 |
| 5,315,377 A | * | 5/1994 | Isono et al. | 348/51 |
| 5,446,479 A | * | 8/1995 | Thompson et al. | 345/139 |
| 5,479,185 A | * | 12/1995 | Biverot | 345/87 |
| 5,519,533 A | * | 5/1996 | Nomura et al. | 345/32 |
| 5,825,539 A | * | 10/1998 | Hoshi | 359/462 |
| 5,864,326 A | * | 1/1999 | Rallison | 345/7 |
| 5,880,711 A | * | 3/1999 | Tamada | 345/139 |
| 5,883,606 A | * | 3/1999 | Smoot | 345/7 |
| 5,949,390 A | * | 9/1999 | Nomura et al. | 345/32 |
| 6,005,608 A | * | 12/1999 | Chakrabarti | 348/46 |
| 6,061,489 A | * | 5/2000 | Ezra et al. | 385/115 |
| 6,064,423 A | * | 5/2000 | Geng | 345/32 |
| 6,160,527 A | * | 12/2000 | Morishima et al. | 345/7 |

FOREIGN PATENT DOCUMENTS

EP        0788008        8/1997

* cited by examiner

Primary Examiner—Richard Hjerpe
Assistant Examiner—Kimnhung Nguyen
(74) Attorney, Agent, or Firm—Fitzpatrick, Cella, Harper & Scinto

(57) ABSTRACT

A three-dimensional image reconstructing apparatus for reconstructing a three-dimensional image and permitting the three-dimensional image to be observed at an observation position by use of an image display for displaying image information, a space optical modulator for forming a fine aperture, an optical system disposed near the space optical modulator, and a controller for controlling the image display and the space optical modulator so that some rays outgoing through the fine aperture of the space optical modulator and the optical system out of rays from the image information displayed on the image display pass a predetermined point in a three-dimensional space within a fixed period, wherein a distance between two closest rays passing the predetermined point and reaching the observation position is determined based on a diameter of a pupil of an observer.

37 Claims, 31 Drawing Sheets

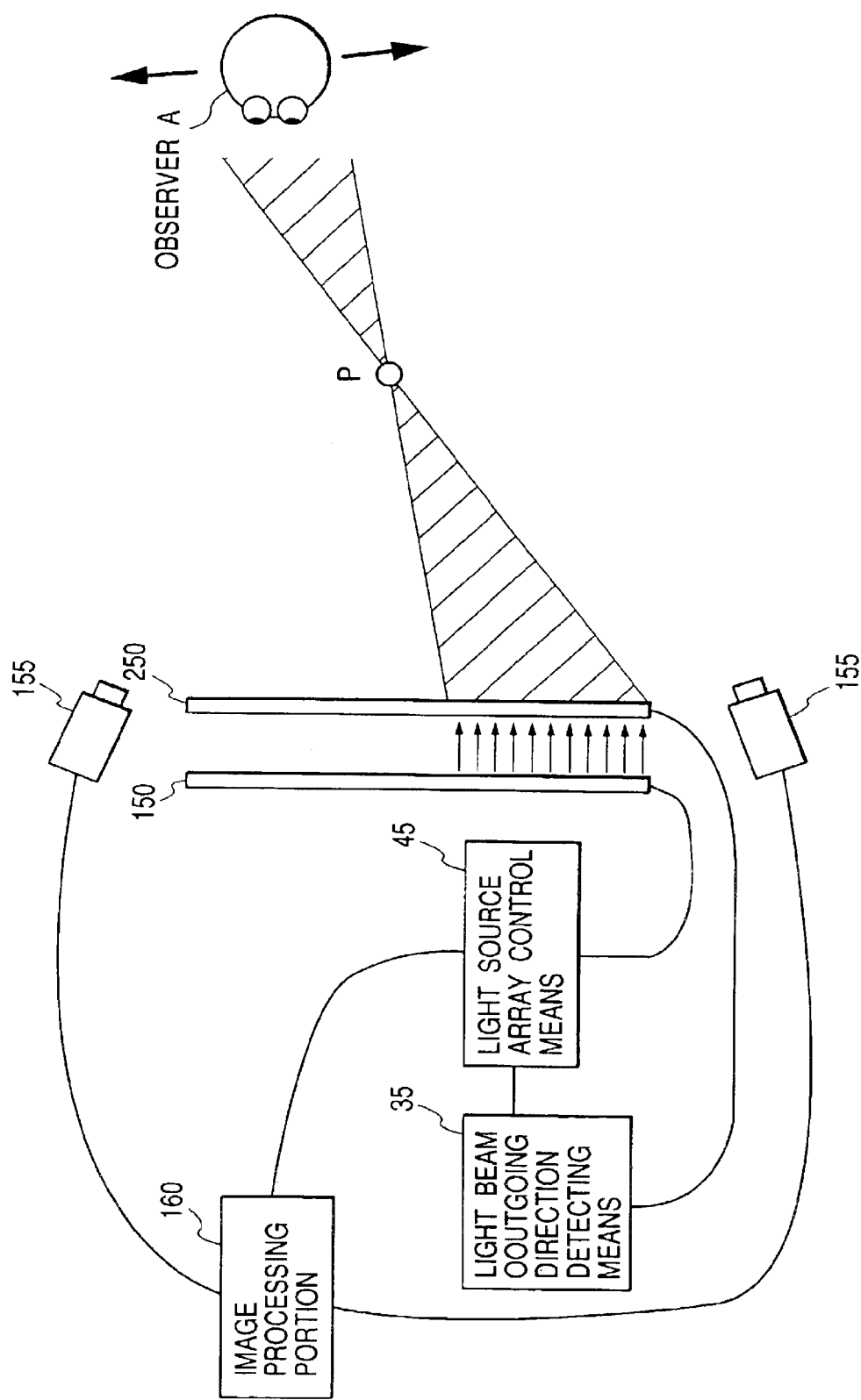

3D IMAGE RECONSTRUCTING APPARATUS AND 3D OBJECT INPUTTING APPARATUS

BACKGROUND OF THE INVENTION

1. Field of the Invention

The present invention relates to a 3D image reconstructing apparatus and a 3D object information inputting apparatus and, more particularly to a 3D image reconstructing apparatus for reconstructing a 3D still or moving image and permitting an observer to observe the 3D image in a natural state and without strain on an observer's eyes and a 3D objective information inputting apparatus that can pick up and record an image of a 3D object readily.

2. Related Background Art

Various methods have been attempted heretofore as methods for three-dimensionally reconstructing a 3D object. Among them, methods for achieving an observer's stereoscopic vision using binocular parallax (a polarizing spectacle method, a lenticular method, etc.) are popularly used; however, since there occurs contradiction between three-dimensional recognition by the accommodation function of eye and stereoscopic recognition by the binocular parallax, the observer often feels tired or incompatible. There are thus many attempts to find methods for reconstruction of 3D images to satisfy the other three-dimensional recognition functions of the eye without relying on only the binocular parallax.

Such 3D image reconstructing methods include, for example, the following two prior art methods, which will be described with problems of the respective methods.

The first prior art method is a method of IP (Integral Photo) system utilizing pinholes, as proposed in Japanese Laid-open Patent Application No. 6-133340 and as shown in FIG. 1. FIG. 1 is a schematic view to show the major part of the "stereoscopic image reconstructing apparatus" used in this method. This apparatus is composed of a pinhole panel 114 and a multi-image surface 112. In the pinhole panel 114 pinholes 113 are disposed horizontally and vertically at small intervals and in parallel, and the other portions have a light intercepting property. When an object 116 is present in front of the pinhole panel 114, small images 111 are formed by rays passing the respective pinholes on the multi-image surface 112.

When these small images all are recorded as multi-photos 115 and again placed on the multi-image surface, such rays as to reversely trace the rays emitted from the object 116 upon recording go out through each pinhole 113, thereby reconstructing a stereoscopic image similar to the object 116. However, since the rays are sampled only at positions of the pinholes both upon recording and upon reconstruction, all the rays emitted from the actual object cannot be reconstructed.

Then the method described in Japanese Laid-open Patent Application No. 6-160770 uses an electronic display panel capable of displaying a dynamic image for each of the pinhole panel 114 and the multi-image surface 112; the pinhole position is moved at high speed in time division and a group of small images according to pinhole positions at respective times are displayed at high speed on the multi-image surface 112, thereby preventing decrease in the number of rays upon reconstruction. The observer can observe a stereoscopic image with improved luminance and as if the rays radiate from the entire surface of the pinhole panel 114, thanks to the afterimage effect of the eye. Dynamic stereoscopic images can also be reconstructed by use of the electronic display panel.

Meanwhile, the 3D object information input apparatus dedicated to this 3D image reconstructing apparatus can be constructed by placing an image pickup element instead of the display panel on the multi-image surface 112 in the same structure.

The stereoscopic image reconstructing apparatus shown in FIG. 1 permits many people to observe a stereoscopic image simultaneously without any special device such as spectacles and also permits an observer to observe a stereoscopic image from different observing points.

However, the stereoscopic image reconstructing apparatus shown in FIG. 1 has the following problems.

First, since the diameter of the pinholes cannot be set below a certain value in view of the luminance of reconstructed image, it is unavoidable for the rays after passage through the pinholes to have some considerable spread. This causes decrease in the resolution of the reconstructed image.

Second, the observer's eyes must be focused on the image surface, which makes a contradiction against recognition by binocular parallax and which exerts a great stress on the observer's eyes.

Third, since the resolution of the small images recorded on the multi-image surface is reflected to that of the reconstructed stereoscopic image as it is, a display panel with a very high resolution needs to be used in order to achieve a stereoscopic image in a sufficient resolution.

Further, the second prior art method is a method for reconstructing a 3D object by use of the holography technology, for example, as proposed in Japanese Laid-open Patent Application No. 64-84993. FIG. 2 is a schematic view of a real-time hologram reconstructing apparatus using a liquid-crystal dot matrix display device used in this method.

In the drawing, a microprocessor 25-1 and a video control apparatus 25-2 produce interference fringe patterns to enable reconstruction of a desired three-dimensional image and a driver circuit 25-3 writes the above interference fringe patterns as bright and dark patterns on a liquid-crystal dot matrix device 25-4.

The patterns are irradiated by laser light emitted from a laser emitting circuit 25-5 and observed along direction A, whereby the observer can observe a three-dimensional image displayed on the liquid-crystal dot matrix device 25-4. Further, the apparatus permits the observer to observe a three-dimensional dynamic image, by dynamically changing the interference fringe patterns written on the liquid-crystal dot matrix device 25-4.

However, the real-time hologram reconstructing apparatus as a 3D image reconstructing apparatus shown in FIG. 2 has the following problems.

First, the resolution of the liquid-crystal dot matrix device as a space modulator for displaying the interference fringe patterns is considerably lower than that of photosensitive materials such as the conventional film, so that angles of diffraction of reconstructing light cannot be made so large. Therefore, the observation area of reconstructed image becomes narrow.

Second, the effective area of the space modulator capable of forming such fine interference fringe patterns, as used in the real-time hologram reconstructing apparatus, cannot be made so large in general. Therefore, the size of reconstructed image is limited.

Third, utilization efficiency of diffracted light of the space modulator capable of forming such fine interference fringe patterns, as used in the real-time hologram reconstructing apparatus, is generally very low.

Fourth, information amounts of the interference fringe patterns displayed on the space modulator are too large to be processed by the arithmetic and process system of the interference fringe patterns.

SUMMARY OF THE INVENTION

According to the first aspect of the present invention, an object is to provide a 3D image reconstructing apparatus that permits the observer to observe a 3D image in a natural state and without strain and a 3D object information input apparatus that can perform input and record of 3D object information from an existing object by a simple structure, and the apparatus for solving the problems of the first prior art described above is constructed as follows.

A 3D image reconstructing apparatus is a three-dimensional image reconstructing apparatus for reconstructing a three-dimensional image and permitting the three-dimensional image to be observed at an observation position by use of image display means for displaying image information, spatial light modulating means for forming a fine aperture, an optical system disposed near the spatial light modulating means, and control means for controlling the image display means and the spatial light modulating means so that some rays outgoing through the fine aperture of the spatial light modulating means and the optical system out of rays from the image information displayed on the image display means pass a predetermined point in a three-dimensional space within a fixed period, wherein a distance between two closest rays passing the predetermined point and reaching the observation position is determined based on a diameter of a pupil of an observer (this configuration will be referred to as configuration A).

Particularly, the apparatus is characterized by the following configurations.

The distance between the two closest rays reaching the observation position is determined to be not more than the diameter of the pupil of the observer.

The distance between the two closest rays reaching the observation position is determined to be not more than 2 mm.

A configuration of the spatial light modulating means is determined so that a maximum diameter of rays outgoing through the fine aperture of the spatial light modulating means and the optical system becomes not more than the diameter of the pupil of the observer.

A configuration of the spatial light modulating means is determined so that a maximum diameter of rays outgoing through the fine aperture of the spatial light modulating means and the optical system becomes not more than 2 mm.

The control means controls the spatial light modulating means so that only a vertical length of the fine aperture of the spatial light modulating means becomes equal to a vertical length of an entire area of the spatial light modulating means.

The control means controls the fine aperture of the spatial light modulating means so as to move the fine aperture throughout an entire area of the spatial light modulating means without duplication within the fixed period.

The fixed period is shorter than a permissible time of afterimage of the observer.

The fixed period is within a range of 1/30 to 1/60 sec.

The image information is equal to image information obtained when the three-dimensional image to be reconstructed is reversely projected onto an image display surface of the image display means through the spatial light modulating means and the optical system.

Each of the spatial light modulating means, the optical system, and the image display means is divided into plural areas, the optical system is arranged so that the divisional areas have respective optical axes different from each other, the spatial light modulating means is arranged so that a single fine aperture is formed in every area, and the image display means is arranged so that image information is displayed in every area.

A light-intercepting partition is provided in a space between the image display means and the optical system so that light forming the image information displayed in each of the plural divisional areas of the image display means is incident to only a corresponding area of the optical system.

The controlling means controls an existing area of the fine aperture of the spatial light modulating means and the image information, so that directivity is given to a predetermined point in the 3D space veiwed from the observation position.

The control means performs a hidden-surface process of the reconstructed image by such a control that when one ray outgoing through the fine aperture of the spatial light modulating means and the optical system passes plural points on the reconstructed image in the three-dimensional space, the predetermined point in the three-dimensional space becomes a farthest point from the fine aperture.

A refracting member is provided on the light incidence side or on the light emergence side of the spatial light modulating means.

The control means comprises reversing means for reversing the image information.

The spatial light modulating means is comprised of a transmission type liquid-crystal display device.

The spatial light modulating means is located closer to the observer than the image display means.

A 3D object information input apparatus of the present invention is a three-dimensional object information input apparatus wherein the image display means of the three-dimensional image reconstructing apparatus of configuration A is replaced by image pickup means, the three-dimensional object information input apparatus being arranged to achieve time-series input of image information projected onto the image pickup means and position information of the fine aperture at that time while controlling the position of the fine aperture of the spatial light modulating means in the same manner as in the three-dimensional image reconstructing apparatus.

Particularly, the apparatus is characterized by the following configuration.

The image pickup means comprises image reversing means.

According to the second aspect of the present invention, an object is to provide a 3D image reconstructing apparatus that can accurately and quickly reconstruct a large predetermined 3D image in a wide observation area in a 3D space and that permits the observer to observe a good 3D image, and the apparatus for solving the problems of the second prior art described previously is constructed as follows.

A 3D image reconstructing apparatus of the present invention is a three-dimensional image reconstructing apparatus having a light source array in which a plurality of light source portions for radiating rays with single directivity are arrayed, ray emission direction control means for emitting the rays therefrom while controlling the rays from the plural light source portions of the light source array independently of each other, and control means for controlling radiating states of the plural light source portions and ray emission directions from the ray emission direction control means so that a set of rays from the ray emission direction control means pass a predetermined point in a three-dimensional space within a fixed unit period, wherein when a three-dimensional image of the predetermined point is reconstructed and the three-dimensional image of the predetermined point is observed at an observation position, utilizing these means, the control means controls a distance between two closest rays passing the predetermined point and reaching the observation position in accordance with a diameter of a pupil of an observer (this configuration will be referred to as configuration B).

Particularly, the apparatus is characterized by the following configurations.

The control means controls the distance between the two closest rays reaching the observation position so as to be not more than the diameter of the pupil of the observer.

The control means keeps the distance between the two closest rays reaching the observation position, not more than 2 mm.

The fixed unit period is shorter than a permissible time of afterimage of the observer.

The fixed unit period is within a range of 1/30 to 1/60 sec.

The ray emission direction control means has a vibratory microlens array.

Emission directions of rays omitted from the ray emission direction control means are controlled by relative vibration between the light source array and the ray emission direction control means.

The relative vibration between the light source array and the ray emission direction control means is a zigzag motion.

The light source portion has a radiating portion and a collimator lens for condensing rays from the radiating portion and for emitting the rays in the form of parallel light.

A telecentric system for making principal rays from the plural light source portions of the light source array outgoing in the form of nearly parallel light is provided on the light emission side of the light source array.

The microlens array has a thickwise cross section comprised of a continuous wave shape.

Rays from the predetermined point when observed from the observation position are provided with directivity by controlling radiating states of light source portions within a predetermined area out of the plural light source portions of the light source array.

The control means performs a hidden-surface process of the reconstructed image so that when one ray from the light source portion passes plural points on the reconstructed image in the three-dimensional space, the predetermined point in the three-dimensional space when observed from the observation position becomes a farthest point from the ray emission direction control means among the plural points.

A refracting member is provided on the light incidence side or on the light emergence side of the ray emission direction control means.

Another 3D image reconstructing apparatus of the present invention is a three-dimensional image reconstructing apparatus having a light source array in which a plurality of light source portions for radiating rays with single directivity are arrayed, ray emission direction control means for emitting the rays therefrom while controlling the rays from the plural light source portions of the light source array independently of each other, and control means for controlling radiating states of the plural light source portions and ray emission directions from the ray emission direction control means so that a set of rays from the ray emission direction control means pass a predetermined point in a three-dimensional space within a fixed unit period, wherein when a three-dimensional image of the predetermined point is reconstructed and the three-dimensional image of the predetermined point is observed at an observation position, utilizing these means, the control means determines a distance between two closest rays passing the predetermined point and reaching the observation position, based on a diameter of a pupil of an observer.

Particularly, the apparatus is characterized by the following configurations.

The control means determines the distance between the two closest rays reaching the observation position so as to be not more than the diameter of the pupil of the observer.

The control means keeps the distance between the two closest rays reaching the observation position, not more than 2 mm.

BRIEF DESCRIPTION OF THE DRAWINGS

FIG. 57 is a schematic drawing where a portion of FIG. 40 is modified.

DETAILED DESCRIPTION OF THE PREFERRED EMBODIMENTS

First described are embodiments of the present invention according to the first aspect described above.

Figure 1:
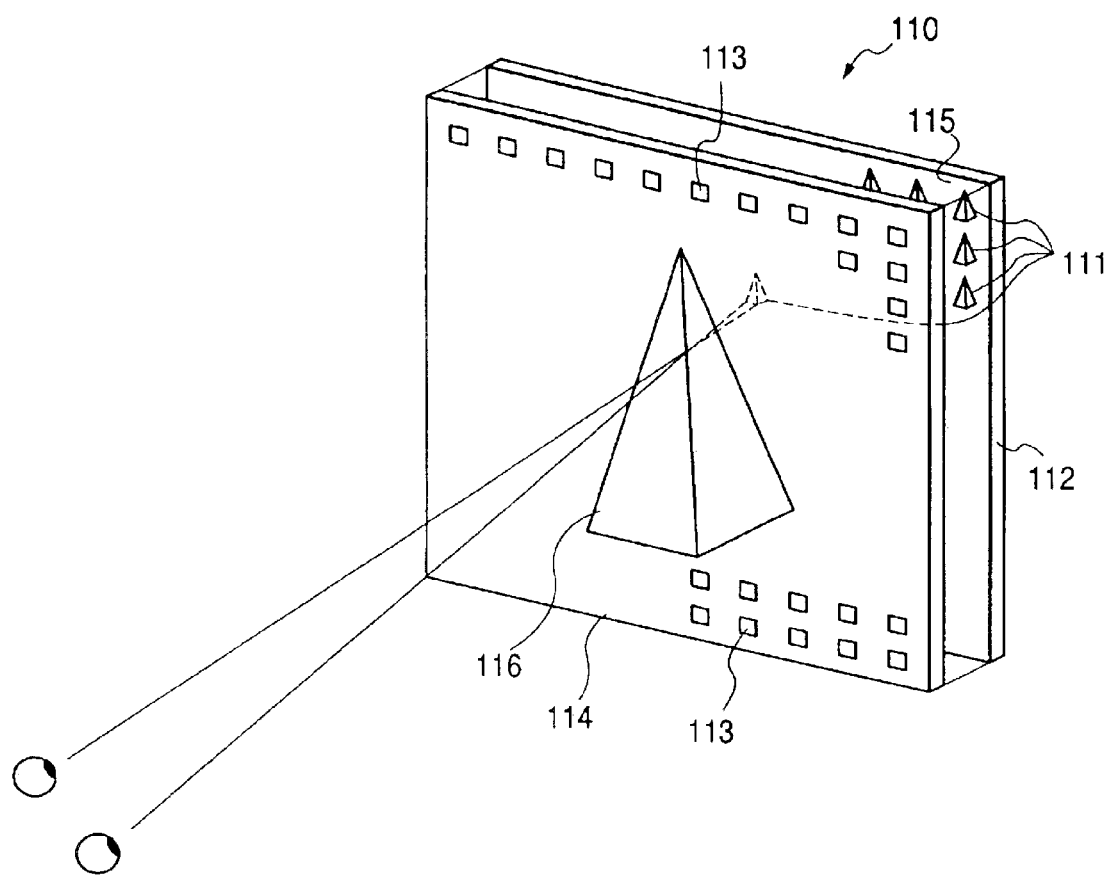
FIG. 1 is a schematic view of the 3D image reconstructing apparatus of the first prior art.
Figure 2:
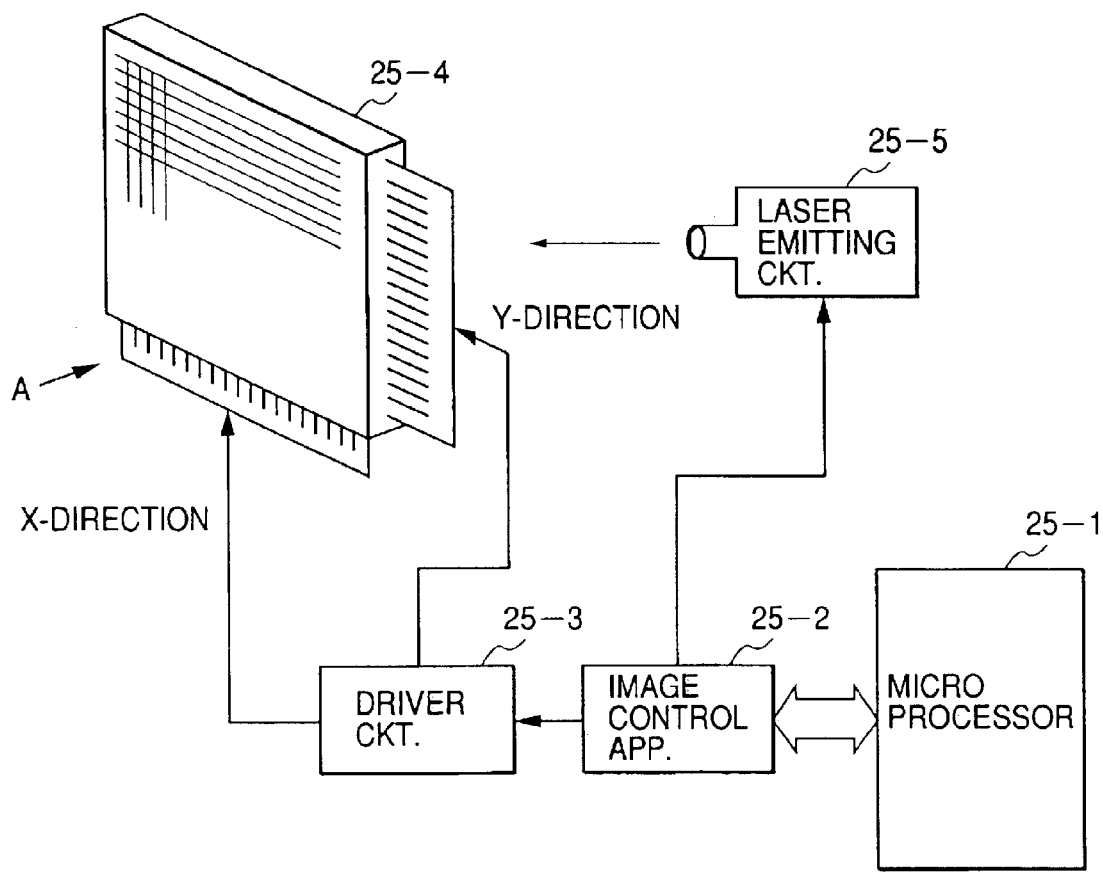
FIG. 2 is a schematic view of the 3D image reconstructing apparatus of the second prior art.
Figure 3:
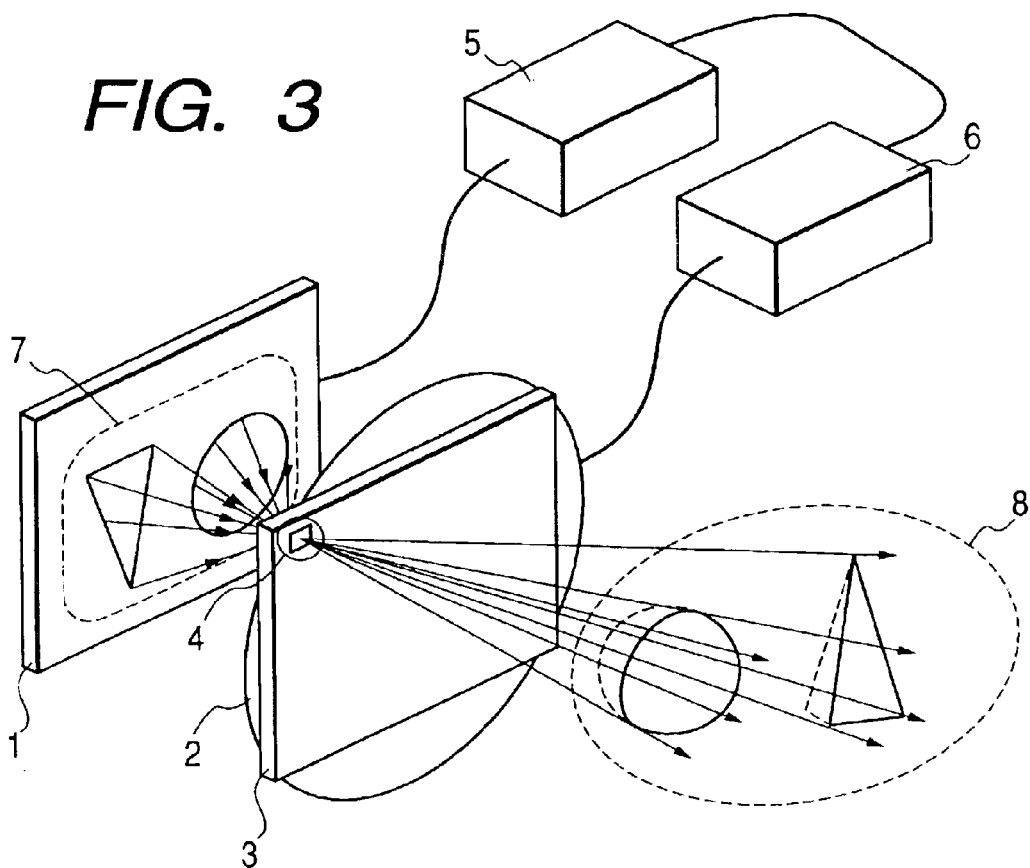
FIG. 3 is a schematic view to show the major part of Embodiment 1 (configuration A) of the 3D image reconstructing apparatus of the present invention.

FIG. 3 is a schematic drawing to show the major part of Embodiment 1 of the 3D image reconstructing apparatus of the present invention. In the drawing reference numeral 1 designates an image display device (image display means), which is an electronic display such as a CRT, a liquid crystal display, or an LED matrix array panel. An image (image information) 7 is displayed on a display surface of the image display 1. This image 7 has an appropriate viewing angle and thus can be observed from inside a vertically and horizontally wide range.

The image display 1 may be any other image forming means if it is a device capable of displaying the image information. The image display may be replaced by a screen section of a projector or an image-formed surface by scan of a laser beam or the like.

Numeral 2 denotes an optical system and 3 a pinhole panel for forming a fine aperture. In the configuration of FIG. 3 the optical system 2 is a convex lens (positive lens). The pinhole panel 3 is composed of a space optical modulator (spatial light modulating means) of a transmission type, which is, for example, a liquid crystal display capable of electronically changing the transmittance at an arbitrary position to form an optical pinhole 4.

Figure 4:
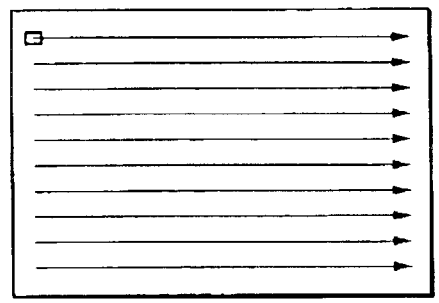
FIG. 4 is an explanatory drawing to illustrate the spatial light modulating means of FIG. 3.
Figure 5:
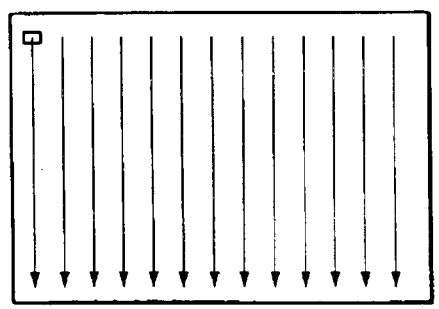
FIG. 5 is an explanatory drawing to illustrate the spatial light modulating means of FIG. 3.

The optical system 2 and pinhole panel 3 are located close to each other. The image display 1 and pinhole panel 3 are driven and controlled by image control device 5 and pinhole control device 6, respectively. The two control devices 5, 6 are connected by a signal line so as to be synchronized with each other. The pinhole 4 moves at high speed and in constant period T over the entire area of the pinhole panel 3. The sequence of movement of the pinhole 4 applicable is, for example, a method for successively performing horizontal scan from top to bottom as shown in FIG. 4, a method for performing vertical scan from right to left or from left to right as shown in FIG. 5, or the like.

In the present embodiment the sequence is arbitrary as long as the entire area is scanned within the constant period T without duplication.

Figure 6:
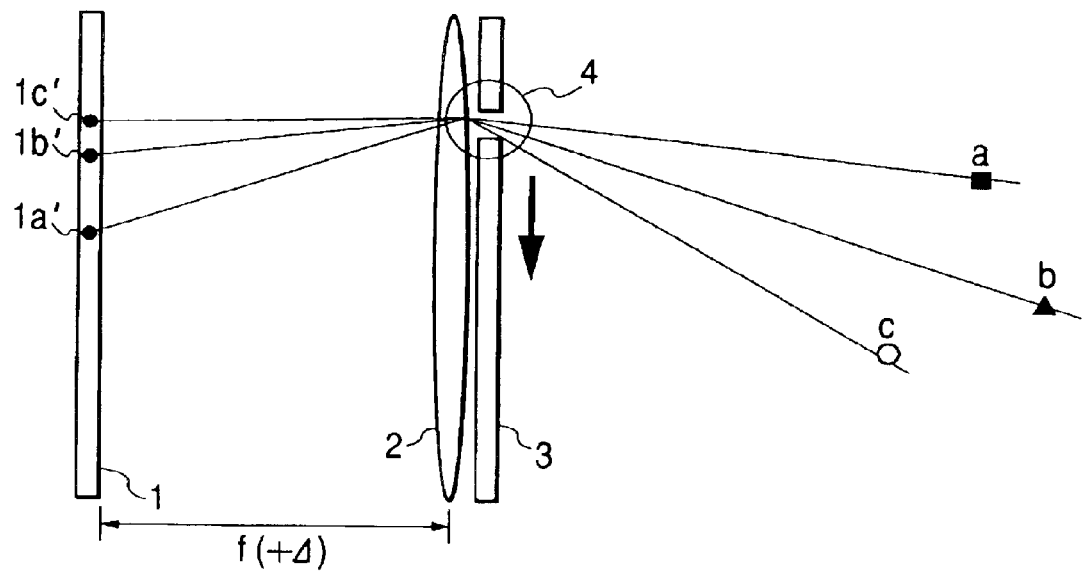
FIG. 6 is an explanatory drawing to show rays passing a portion of FIG. 3.
Figure 7:
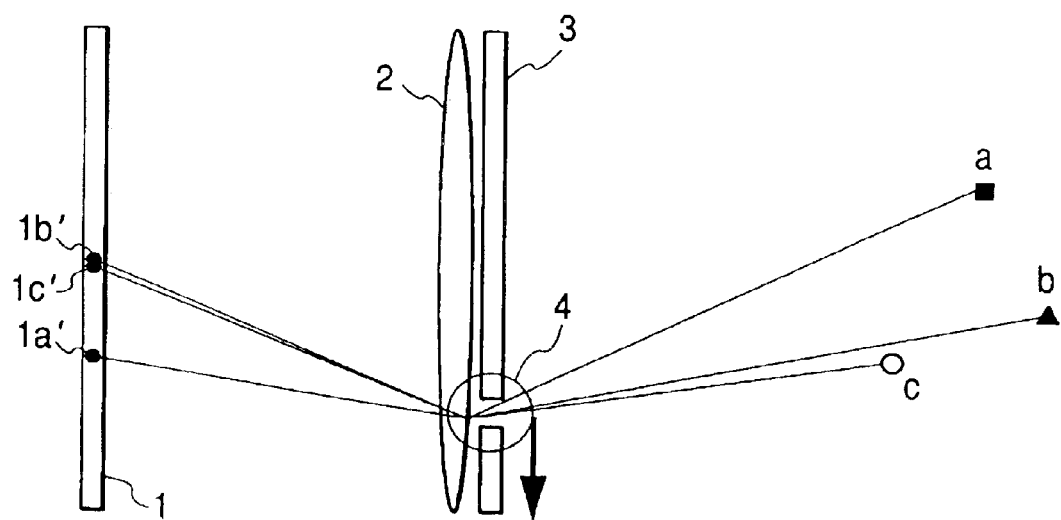
FIG. 7 is an explanatory drawing to show rays passing a portion of FIG. 3.
Figure 8:
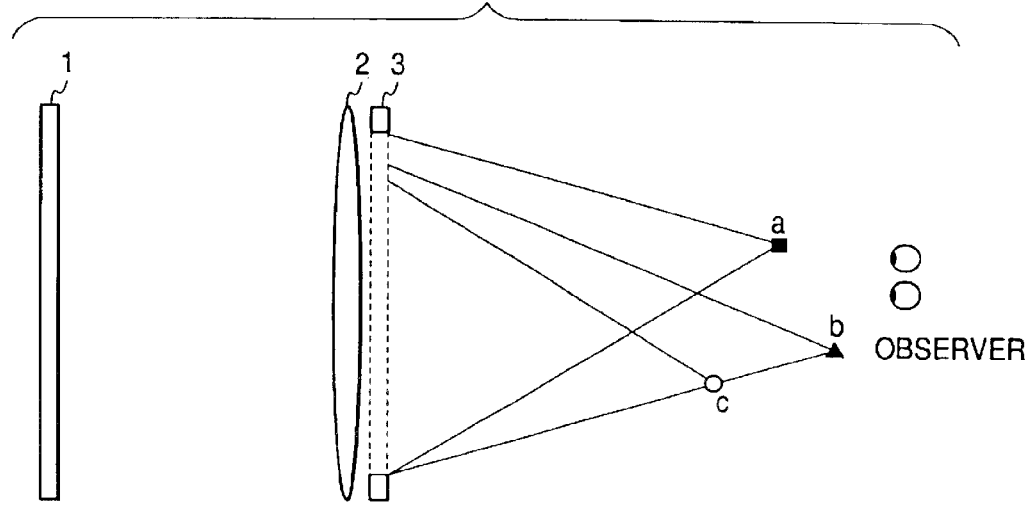
FIG. 8 is an explanatory drawing to show rays passing a portion of FIG. 3.

FIG. 6 to FIG. 8 are plan views to show a part of the present embodiment. A method for reconstructing point images a to c in the 3D space will be described using the plan views of FIG. 6 to FIG. 8. FIG. 6 shows a state of the 3D image reconstructing apparatus at time t1. The pinhole 4 is present at the position as illustrated. Image-forming light on the image display 1 diverges in various directions, but rays reaching the observer's eyes among the diverging rays are only those passing through the pinhole 4. The image display 1 and optical system 2 are spaced from each other by a distance which is equal to the focal length f of the optical system or which is greater than the f by a small distance Δ, so that the light passing through the pinhole 4 becomes a beam of parallel light or converging light close thereto.

Since the positions of the point images a to c desired to be reconstructed at the time t1 and the positions of the pinhole 4 and optical system 2 are uniquely determined, a direction of a ray after passage through the pinhole 4 can be controlled by image information on the image display 1. For example, for generating a ray for reconstructing the point image a, the expected ray can be produced by reversely tracing a ray radiating in the opposite direction to the traveling direction of the light from the point image a, traveling through the pinhole 4, and refracted by the optical system 2, and by giving a luminance corresponding to the point image a to an intersecting point 1a' of the ray and the display surface of the image display 1. Similarly, positions of information 1b', 1c' to be displayed are also uniquely determined for reconstruction of the other points b, c in the space.

As described above, the pinhole 4 moves at high speed throughout the entire surface of the pinhole panel 3. FIG. 7 shows a state of travel of beams at another time t2. Since the pinhole 4 is moved to the position in the drawing, the image information 1a', 1b', 1c' to be displayed on the image display 1 also changes according thereto. Positions of the image information 1a', 1b', 1c can also be determined by the same method as in the case at the time t1, and, therefore, the information to be displayed on the image display 1 can be uniquely determined wherever the pinhole 4 is located.

In the present embodiment the period T in which the pinhole 4 moves across the entire region of the pinhole panel 3 is set to be not more than a permissible time of afterimage of human eye (1/30 to 1/50 sec), so that the observer cannot recognize the movement of the pinhole 4. When the time over the period T has elapsed, the observer recognizes as if the light for reconstructing the 3D point images a, b, c radiates from the entire surface of the pinhole panel 3 as shown in FIG. 8. A 3D surface can be expressed by expanding the point images a to c to a set of many more point images (or by displaying many more point images on the image display) and reconstruction of general 3D image 8 is carried out based thereon in the present embodiment.

The above description with the plan views was the description as to the horizontal image positions of the 3D image, but the control is exactly the same as to the vertical image positions.

It is, however, noted that the reconstructing rays must satisfy a certain condition in order to regenerate the image in a natural state close to the actual observation of a 3D object by the above method. According to the principle of the present invention, each of the point images reproduced is expressed by an intersecting point among plural rays (beams). For recognizing each point, at least two beams must be incident into the observer's pupil. Since diameters of the pupil of human eye are approximately 2 mm to 7 mm, the diameter of the above beams is first set to be not more than the diameter 2 mm. In order that at least two beams are incident into the observer's pupil, a distance between adjacent beams must be small to some extent.

Figure 9:
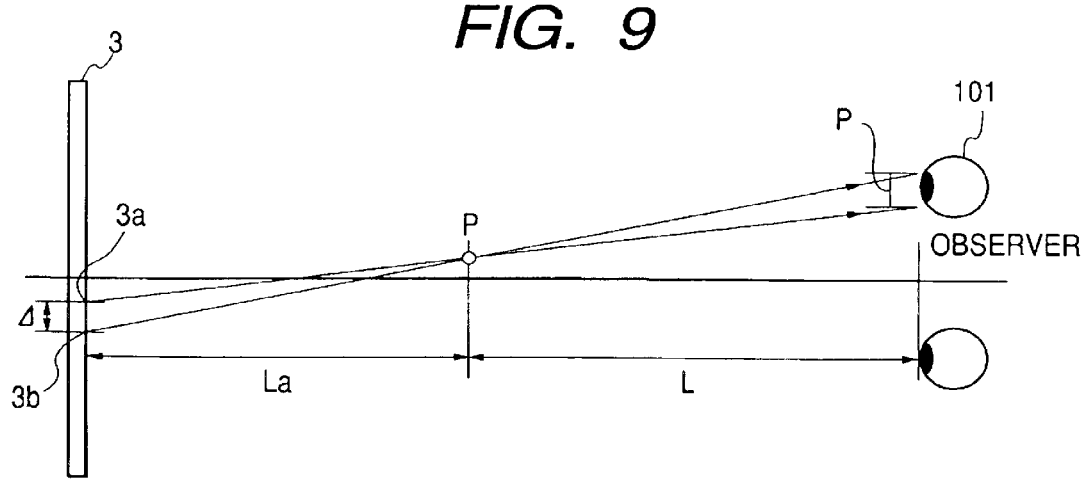
FIG. 9 is an explanatory drawing to show rays passing a portion of FIG. 3.

For geometrically considering this, the positional relation as shown in FIG. 9 needs to be taken into consideration. Let Δ be a distance between adjacent beams 3a, 3b on the pinhole panel 3, La be a distance from the pinhole panel 3 to the reconstructed point image P, and L be a distance from the point image P to the position of the observer's pupil 101. Then a distance p between the beams 3a, 3b at the position of the observer's pupil 101 is expressed as follows.

$$p = \Delta * L/La$$

If the distance p is not more than 2 mm, two or more beams will enter the observer's pupil.

Therefore, the observer can recognize the reconstructed image as a natural 3D image as long as the parameters including the size of the pinhole 4, the resolution of the pinhole panel 3, the positions of reconstructed point images, and the observing position of the observer expected are set based on the above condition. For example, let us consider an example wherein the distance La from the pinhole panel 3 to the reconstructed image P is 300 mm and the distance L from the reconstructed image P to the position of the observer's pupil 101 is 600 mm. Then, in order to satisfy the distance p≦2 (mm), the following relation must be satisfied.

$$\Delta \leq 2 \cdot La/L = 1 \text{ (mm)}$$

Therefore, the resolution of the pinhole panel 3 should be set to be not more than 1 mm.

Further, the light for forming the reconstructed image can be provided with directivity by controlling the image information displayed on the image display 1.

Figure 10:
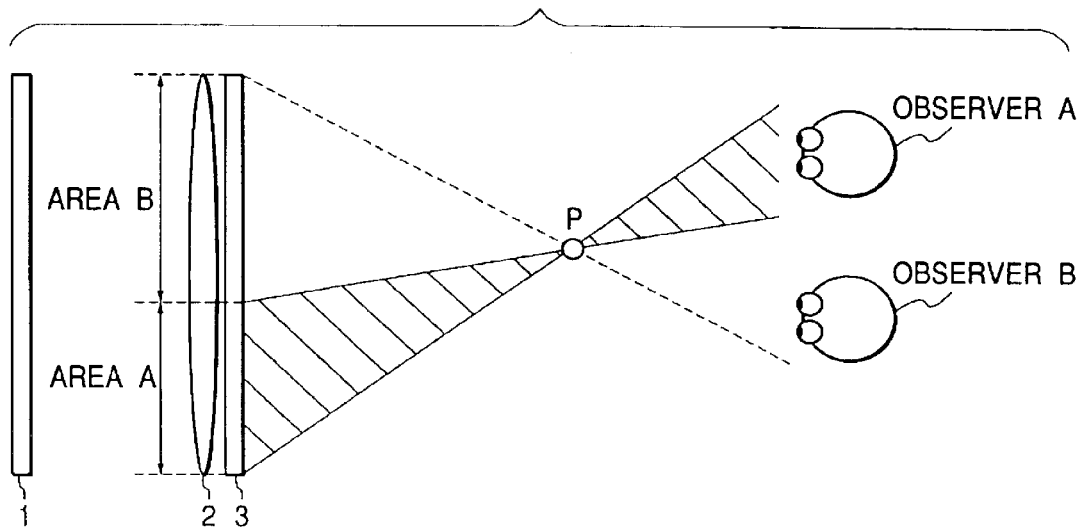
FIG. 10 is an explanatory drawing to illustrate reconstruction of 3D image of FIG. 5.

FIG. 10 is an explanatory drawing to explain this method. Let us consider an example of reconstruction of the point image P. If the all rays for reconstructing the point P are reconstructed at the all positions of the pinhole on the pinhole panel 3, the point image P will be observed by both observers A and B. However, if the image information is controlled so as to reproduce rays only when the pinhole is present in the area A in the drawing but not to generate the rays reproducing the point image P when the pinhole is present in the area B, the beams for reconstructing the point image P will be those with such directivity as to be observed by only the observer A. By well making use of this property, the number of point images to be reconstructed can be minimized and the hidden-surface process can also be carried out in the reconstructed image.

Figure 11:
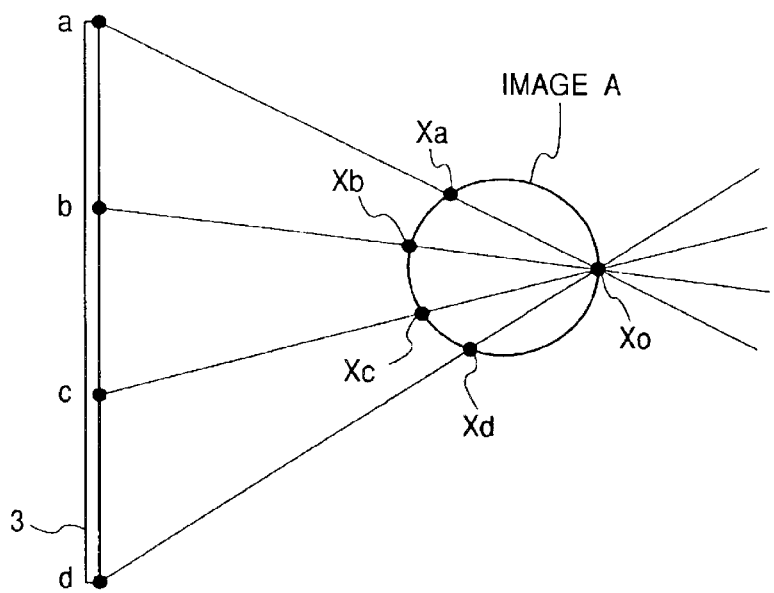
FIG. 11 is an explanatory drawing to illustrate optical paths of rays outgoing from the spatial light modulating means of FIG. 3.

FIG. 11 to FIG. 19 are explanatory drawings to explain this method. FIG. 11 shows the fundamental idea of reconstruction of point image. Let us assume that there are four pinhole existing positions of a to d on the pinhole panel 3.

In order to reconstruct a point X0 on the 3D image A by a set of rays emerging from these positions, the rays should be emitted in respective directions to intersect at the point X0. At this time each ray also intersects with this 3D image A at point Xa, Xb, Xc, or Xd, in addition to the point X0. However, since they are not a convergent point of the rays, they are not recognized as a 3D point image.

As described above, only a convergent point of rays becomes a point image reproduced in the present invention, and whether rays converge or not is controlled by the position of pinhole and the image information displayed on the image display 1.

Based on the above idea, the number of reconstructed image points can be minimized and the efficiency of reconstruction can be increased upon reconstruction of 3D image. In each of FIG. 12 to FIG. 15 it is assumed that the pinhole existing positions are the four points of a to d and point images reconstructed are points X1 to X4 on the image A.

Figure 12:
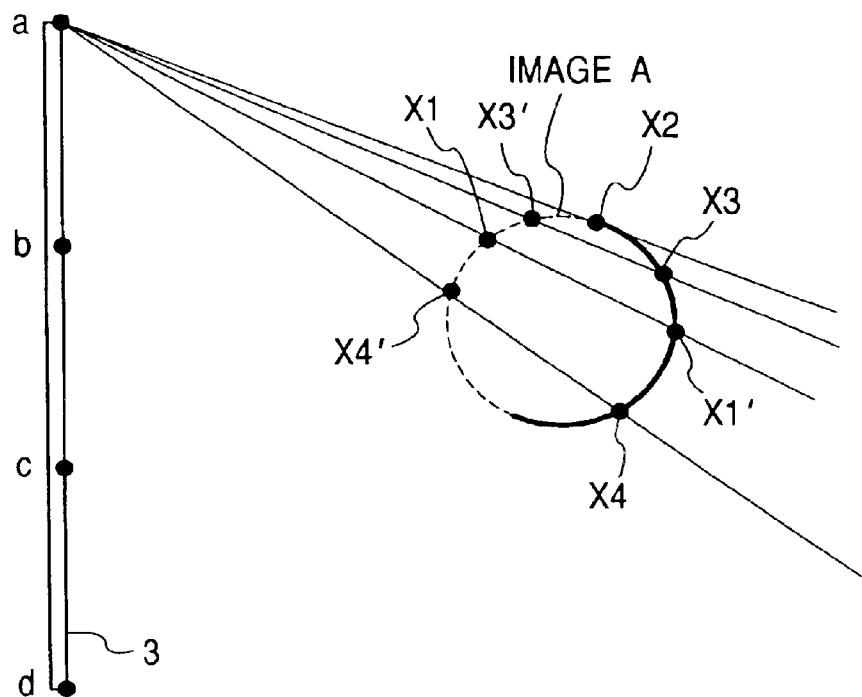
FIG. 12 is an explanatory drawing to illustrate optical paths of rays outgoing from the spatial light modulating means of FIG. 3.
Figure 13:
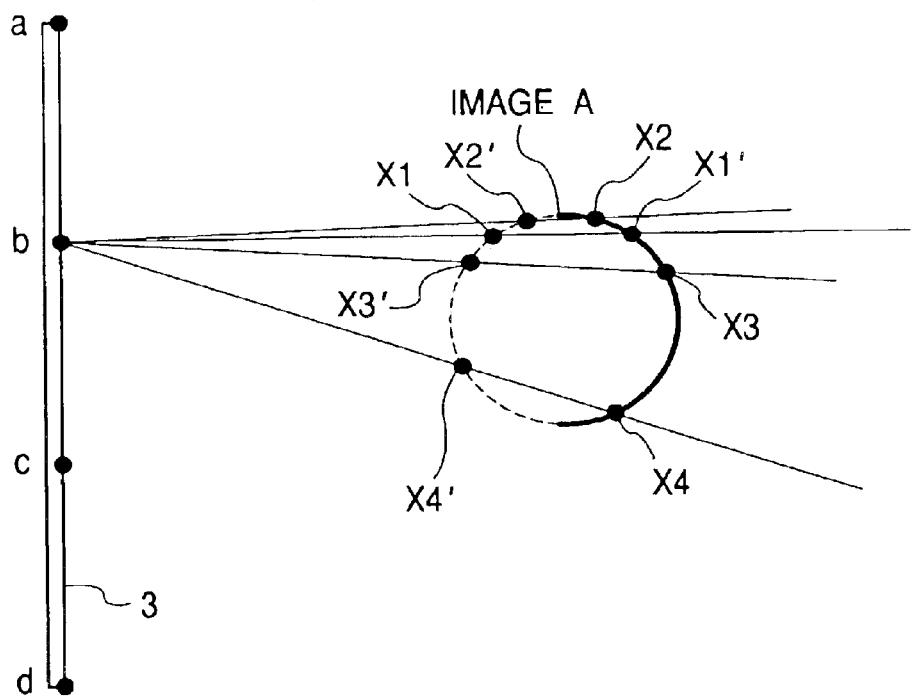
FIG. 13 is an explanatory drawing to illustrate optical paths of rays outgoing from the spatial light modulating means of FIG. 3.
Figure 14:
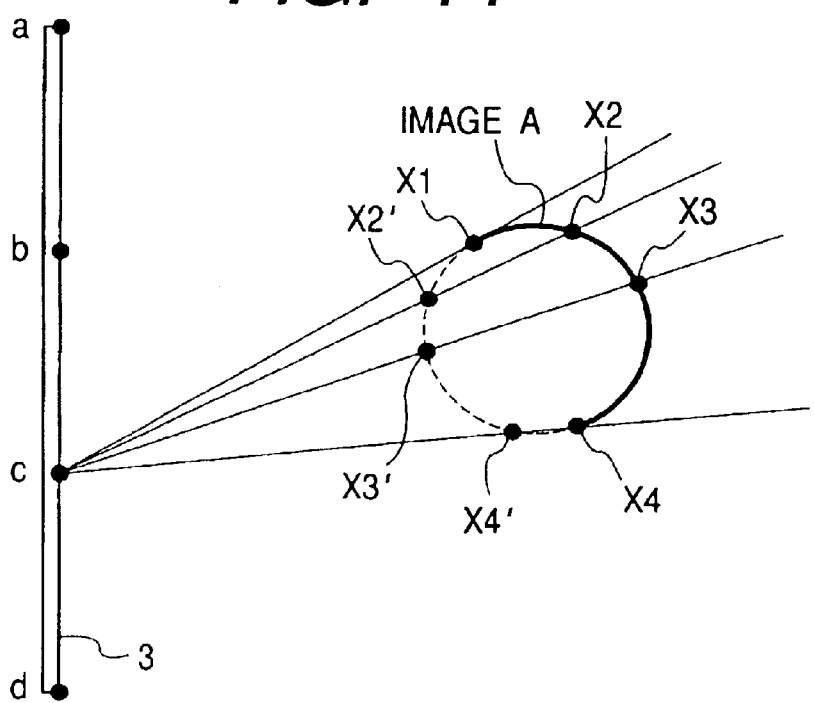
FIG. 14 is an explanatory drawing to illustrate optical paths of rays outgoing from the spatial light modulating means of FIG. 3.
Figure 15:
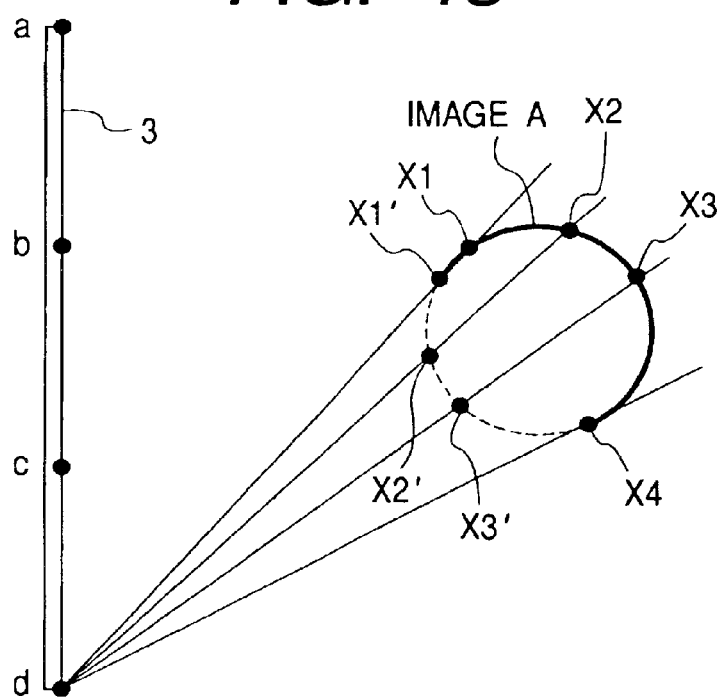
FIG. 15 is an explanatory drawing to illustrate optical paths of rays outgoing from the space optical modulating means of FIG. 3.

In FIG. 12 each of rays outgoing from the pinhole a except for one passing the point X2 has two or more intersecting points with the image A (whereas the ray is tangent at the point X2 to the image A). However, the observer does not have to recognize two reconstructed points on one ray. Point images to be recognized by the observer should be only images of most distant points from the outgoing point out of these points (i.e., only images of closest points to the observer).

In the case of FIG. 12, point X1' is more distant than point X1, point X3 than point X3', and point X4 than point X4'; thus, objective points for reconstruction of the rays from the pinhole a are the points X1', X2, X3, and X4. As described above, a set of the points farther from the point a out of the intersecting points between the outgoing rays from the pinhole a and the image A are the objective points of reconstruction, which are present in the range indicated by a thick solid line in the drawing.

Conversely, a set of points nearer to the pinhole a out of the intersecting points between the outgoing rays from the pinhole a and the image A are non-objective points of reconstruction, and they are present in the range indicated by a thin dotted line in the drawing. The objective points of reconstruction are controlled by the position of pinhole on the pinhole panel 3 and the image information on the image display 1 as described previously. For the rays from the other pinhole positions than the pinhole a, objective points of reconstruction and non-objective points of reconstruction can be determined in the same way and ranges thereof are indicated by a thick solid line and a thin dotted line in each of FIG. 12 to FIG. 14. The main reconstruction objective points for each of the outgoing points are listed together in the following table.

TABLE 1

| Pinhole position | Reconstruction objective points | | | |
| --- | --- | --- | --- | --- |
| a | X1' | X2 | X3 | X4 |
| b | X1' | X2 | X3 | X4 |
| c | X1 | X2 | X3 | X4 |
| d | X1 | X2 | X3 | X4 |

As described above, the all points forming the image A do not have to be reconstructed when only the farthest image points from each pinhole position a to d are used as reconstruction objective points; and reconstruction of one image is completely finished by simply carrying out the control of outgoing directions of rays from one pinhole during one period by the image display 1.

Further, the hidden-surface process can also be done between three-dimensional images by making use of the above method. This method will be described referring to FIG. 16 to FIG. 19. When two images of image A and image B are reconstructed as illustrated, there are some cases in which one is hidden by the other depending upon the observing direction. In such cases the images can also be expressed well by selection and control of reconstruction objective points.

Figure 16:
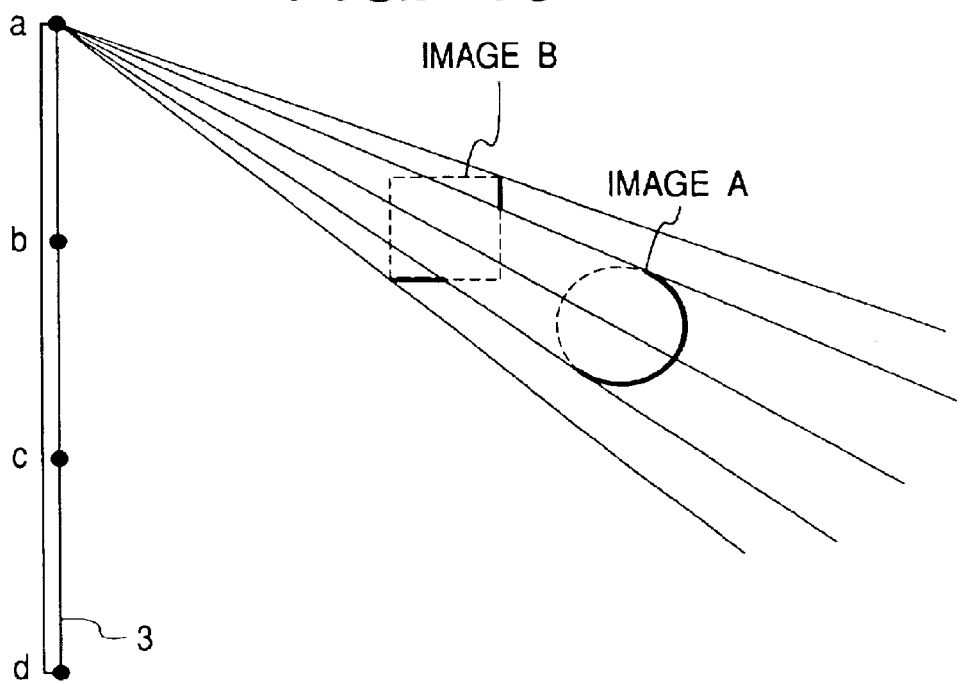
FIG. 16 is an explanatory drawing to illustrate optical paths of rays outgoing from the space optical modulating means of FIG. 3.
Figure 17:
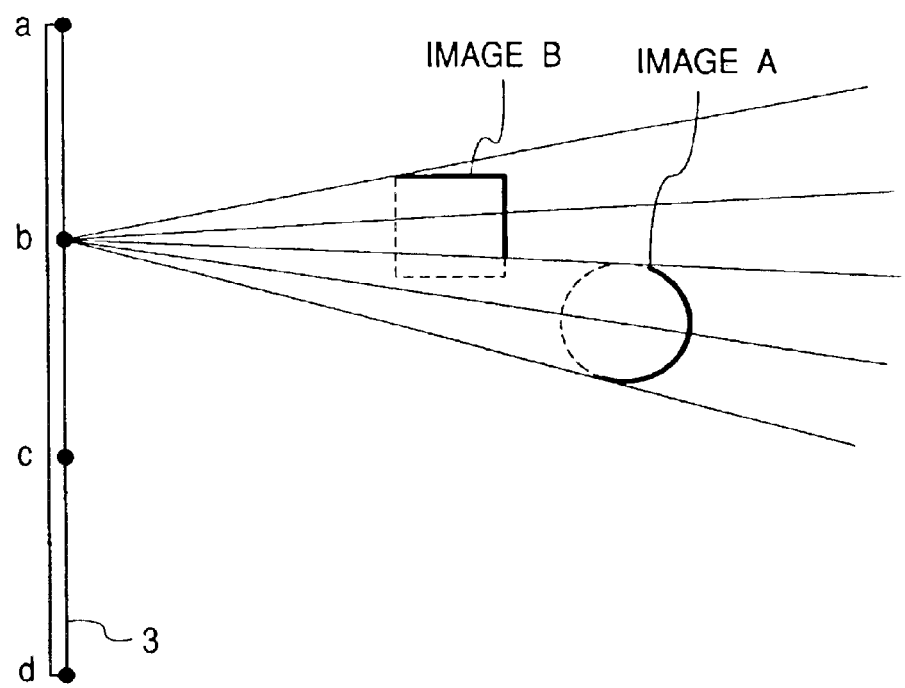
FIG. 17 is an explanatory drawing to illustrate optical paths of rays outgoing from the space optical modulating means of FIG. 3.
Figure 18:
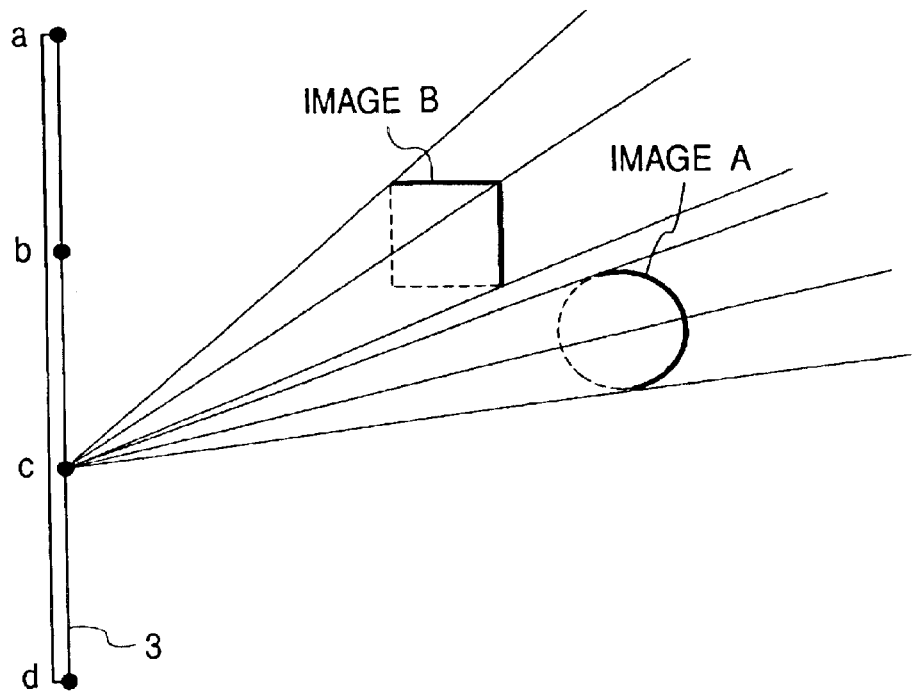
FIG. 18 is an explanatory drawing to illustrate optical paths of rays outgoing from the space optical modulating means of FIG. 3.
Figure 19:
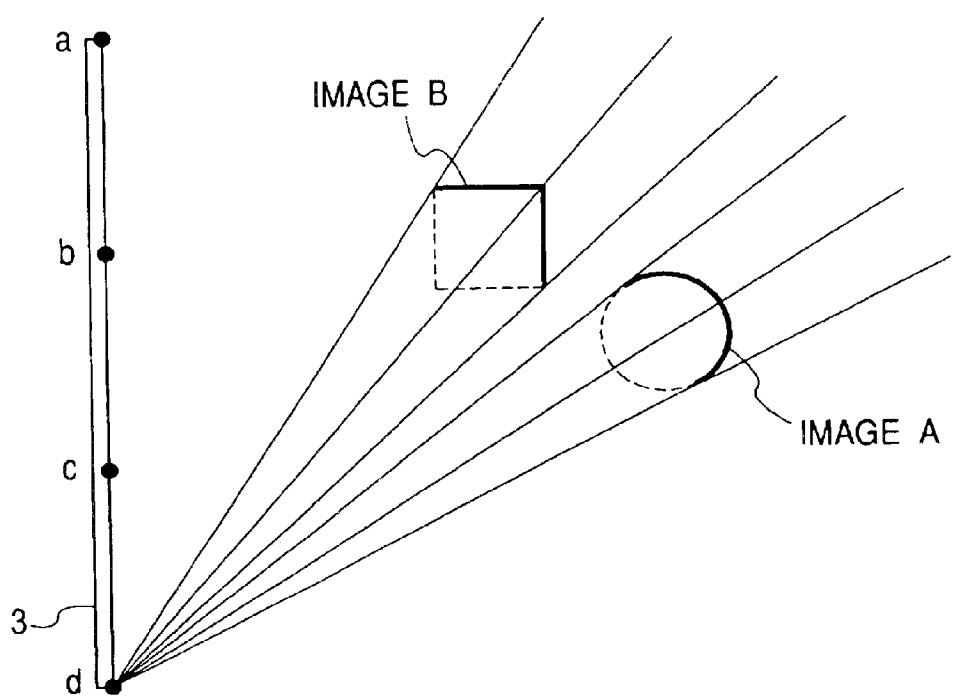
FIG. 19 is an explanatory drawing to illustrate optical paths of rays outgoing from the spatial light modulating means of FIG. 3.

For example, out of intersecting points between rays outgoing from the pinhole a and the reconstructed images A, B in FIG. 16, farthest points from the pinhole a in the both image A and image B are present in the range of thick solid lines in the drawing. Then hidden surfaces are not reconstructed when these points in the range of the thick solid lines are handled as reconstruction objective points and the other points in the range indicated by thin dotted lines in the drawing as non-objective points of reconstruction. For the rays from the pinholes b to d at the other positions than the pinhole a, reconstruction objective points and reconstruction non-objective points can be determined in the same manner, and ranges thereof are indicated by thick solid lines and thin dotted lines in each of FIG. 17 to FIG. 19. The hidden-surface process of 3D image reconstructed is carried out by applying the image reconstruction by the above method to the entire surface on the pinhole panel 3.

If the information of 3D image is known one such as CG (computer graphics), the sequential production of image data described above can be carried out by a computer. The computer generates sets of the position of pinhole and the image information in time series and transmits them to the aforementioned control devices 5 to 6. These data may also be arranged to be stored once as dynamic image information after generated and to be transmitted thereafter to the control devices 5, 6.

Figure 20:
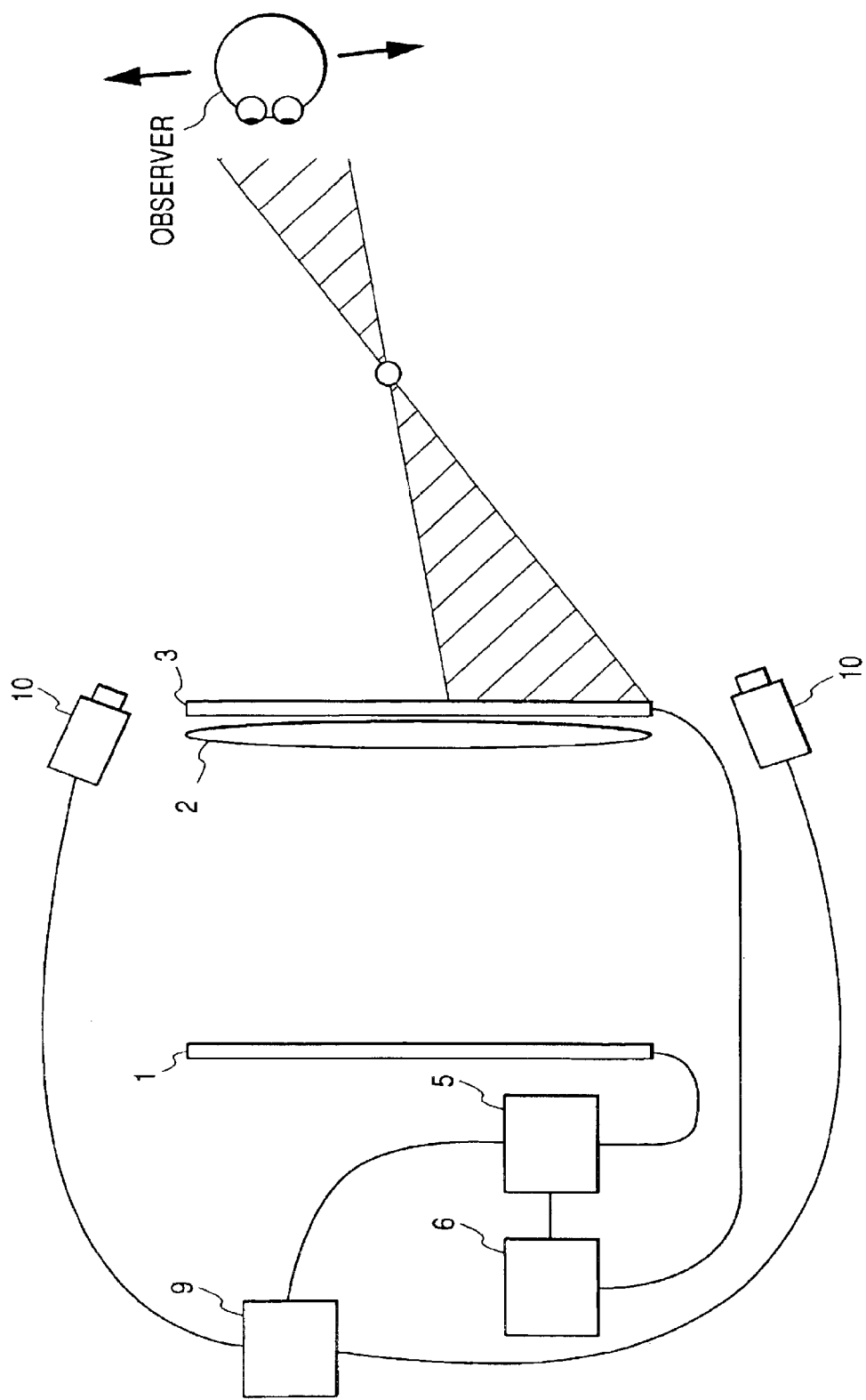
FIG. 20 is a schematic view to show an apparatus in which head position detecting means is added to Embodiment 1 of the 3D image reconstructing apparatus of the present invention.

In the present embodiment the speed of generation of reconstructed image data and the speed of reconstruction of image are increased by a combinational arrangement with head position detecting means for detecting information of a position of the observer's head. FIG. 20 is an explanatory drawing to illustrate the principle of this method.

In FIG. 20 numeral 9 represents an image processing portion for processing signals from the head position detecting means 10 comprised of a stereo camera for detecting the position of the observer's head. The image processing portion 9 analyzes a stereoscopic image obtained by the stereo camera 10 to detect the position of the observer's head. The data of the head position is sent to the image control device 5. After the position of the observer's head is specified, rays for reconstruction of image are emitted to the head existing range. Thus the image display range on the image display 1 and the pinhole existing range on the pinhole panel 3 are limited to a narrow range. This reduces the computational complexity to generate the reconstructed image data and narrows the ranges to be driven in the image display 1 and pinhole panel 3, thereby greatly decreasing the time necessary for reconstruction of one image.

The optical system 2 in the present embodiment converts the diverging light from the image display 1 to the parallel light or the converging light close thereto. Therefore, the optical system may be replaced by another optical system that has this function. This optical system 2 may be placed on either side of the pinhole panel 3 and may be separated into two parts place on the both sides.

Figure 21:
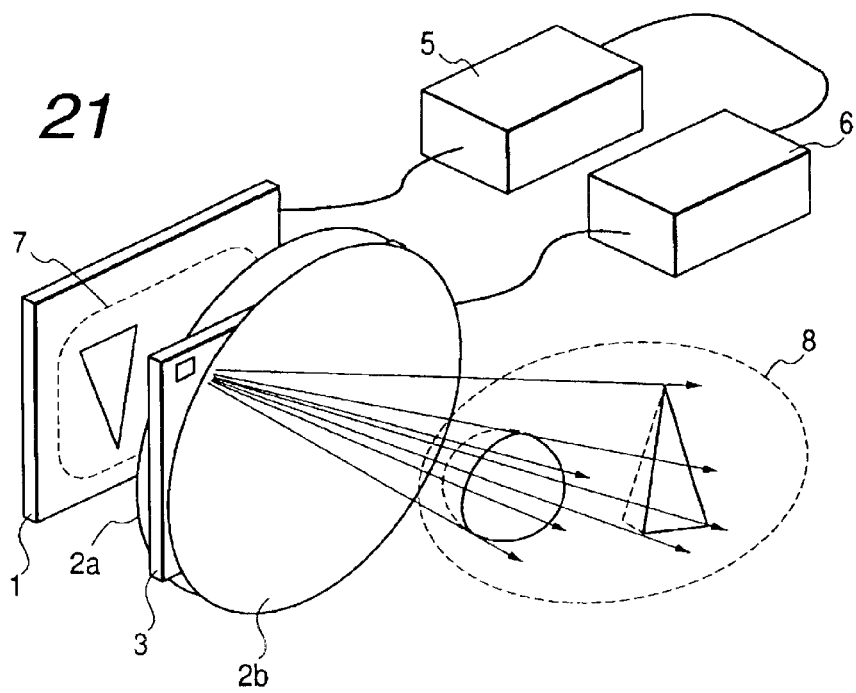
FIG. 21 is a schematic view to show an apparatus obtained by modifying a part of Embodiment 1 of the 3D image reconstructing apparatus of the present invention.

FIG. 21 shows an example in which the optical system 2 is composed of two positive lenses 2a, 2b and they are placed before and after the pinhole panel 3. This shortens the focal length of the overall optical system, thus decreasing the distance between the pinhole panel 3 and the image display 1. When the light from the image display 1 is converted to the converging beam, the position of the beam where the minimum diameter is achieved after passage through the pinhole is desired to be located near the 3D image.

This is for achieving the following two objects.

(a) To prevent decrease in the resolution of reconstructed image due to the spread of beam (b) To minimize the contradiction against the accommodation mechanism of observer's eye For example, supposing the overall focal length of the optical system 2 is 250 mm and the distance from the position of the principal plane of the optical system 2 to the 3D image is approximately 500 mm, the 3D image can be reconstructed in high resolution and without giving the observer an unnatural feeling when the distance from the position of the principal plane of the optical system 2 to the image display surface is set to about 500 mm.

The 3D image reconstructing apparatus of the present invention generates the rays by use of the pinhole and reconstructs the 3D image forming light by collecting the rays in time series. However, a high-speed space optical modulator and a high-band controller both are necessary for scan of the small pinhole within very short time.

This problem is solved in the present embodiment by giving up the vertical parallax of 3D image, which is not so important for the stereoscopic recognition of observer, and using an elongate slit extending in the vertical direction instead of the pinhole. For example, let us consider a case wherein the period in which the pinhole or the slit scans the entire surface is ⅓₀ sec and the pinhole or the slit is formed in the resolution of 1 mm on the pinhole panel of 150 mm long and 200 mm wide. Then the frame rate (image rewrite frequency) required for the pinhole panel is calculated for each case. The frame rate is 900 kHz in the case of the pinhole while it is 6 kHz in the case of the slit. Therefore, it is seen that the frame rate in the case of the slit scan is definitely lower than that in the pinhole scan.

Figure 25:
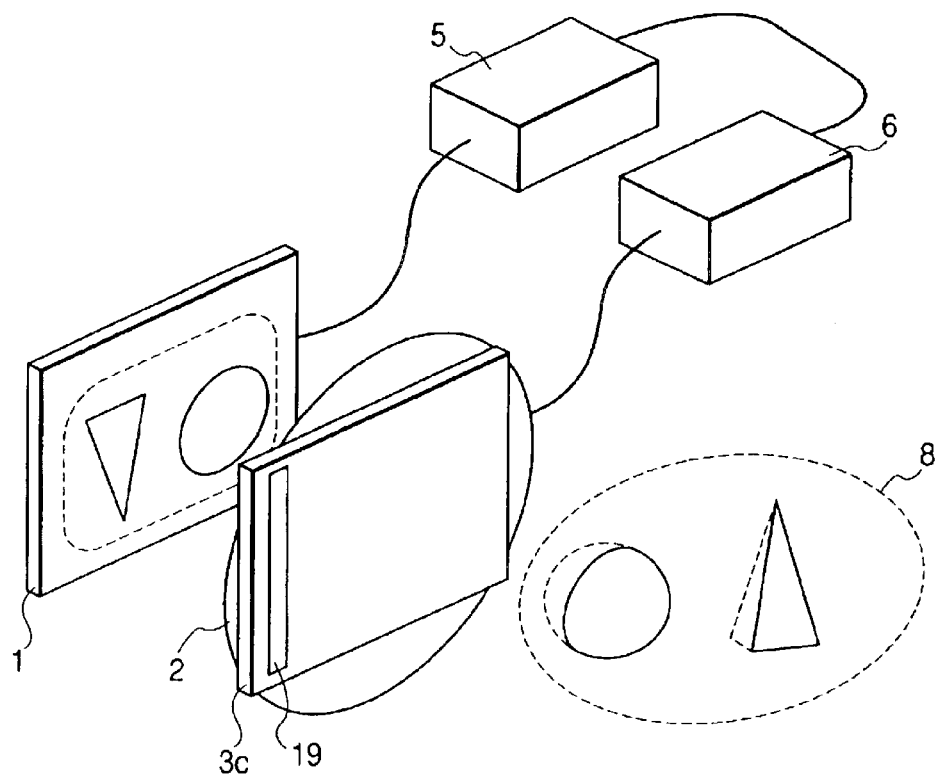
FIG. 25 is a schematic view to show an apparatus obtained by modifying a part of Embodiment 2 of the 3D object information input apparatus of the present invention.

FIG. 25 exemplifies a configuration for forming the slit 19 instead of the pinhole as a small aperture in the 3D image reconstructing apparatus. The aperture formed on the slit panel 3c is a vertically long slit 19 having the width equivalent to that of the aforementioned pinhole and the height equivalent to that of the pinhole panel. The slit 19 moves at high speed from right to left or from left to right on the slit panel 3c, but the sequence can be determined arbitrarily as long as the slit scans the entire region of the panel 3c within the fixed period and without duplication as in the case of the scanning of pinhole.

The image information displayed on the image display 1 is generated according to the position of the slit in the same manner as in the case of the pinhole. Since there is no vertical parallax, the vertical focus of 3D image recognized by the observer is always located on the image plane uniquely determined by the positional relation between the optical system (lens) 2 and the image display 1.

Figure 26:
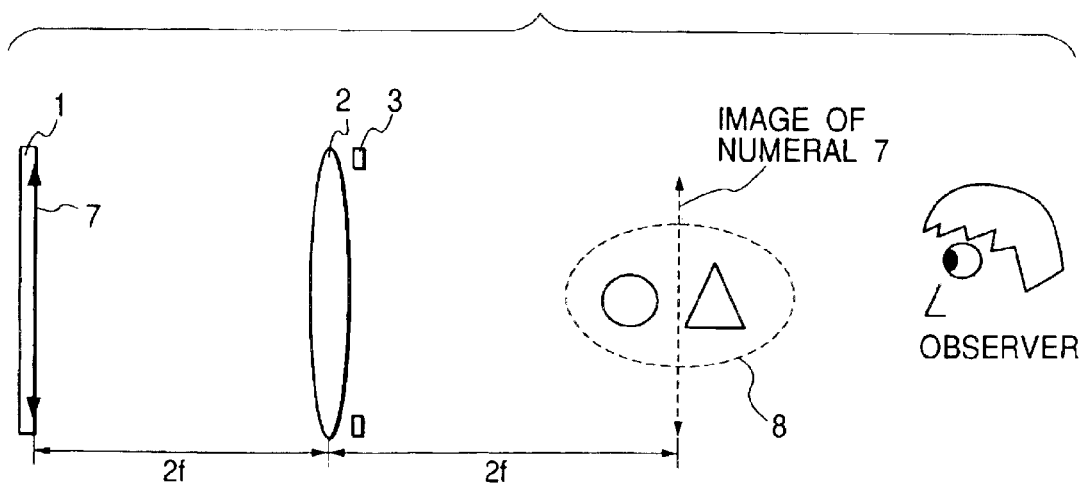
FIG. 26 is a side view to show the major part of Embodiment 1 of the 3D image reconstructing apparatus of the present invention.

For example, when the distance between the lens 2 and the image display 1 is two times larger than the focal length f of the lens, i.e., when the distance=2f as shown in the side view of FIG. 26, the image information is focused at the position 2f apart from the lens 2. Since the slit 19 is elongate in the vertical direction, the observer has no clue to the focus in the horizontal direction, but the above-stated image focus position in the vertical direction can be used as a clue to the focus. Therefore, the image focus position in the vertical direction is desirably located near the 3D image 8 reconstructed, as shown in the example of FIG. 26.

This is equal to the optimum beam converging position described above. If it is desired to control the beam converging characteristics in the horizontal direction and the focus position in the vertical direction independently of each other, the refracting power in the vertical direction may be set to be different from that in the horizontal direction by using a cylindrical lens or an anamorphic optical system as the optical system 2.

Figure 22:
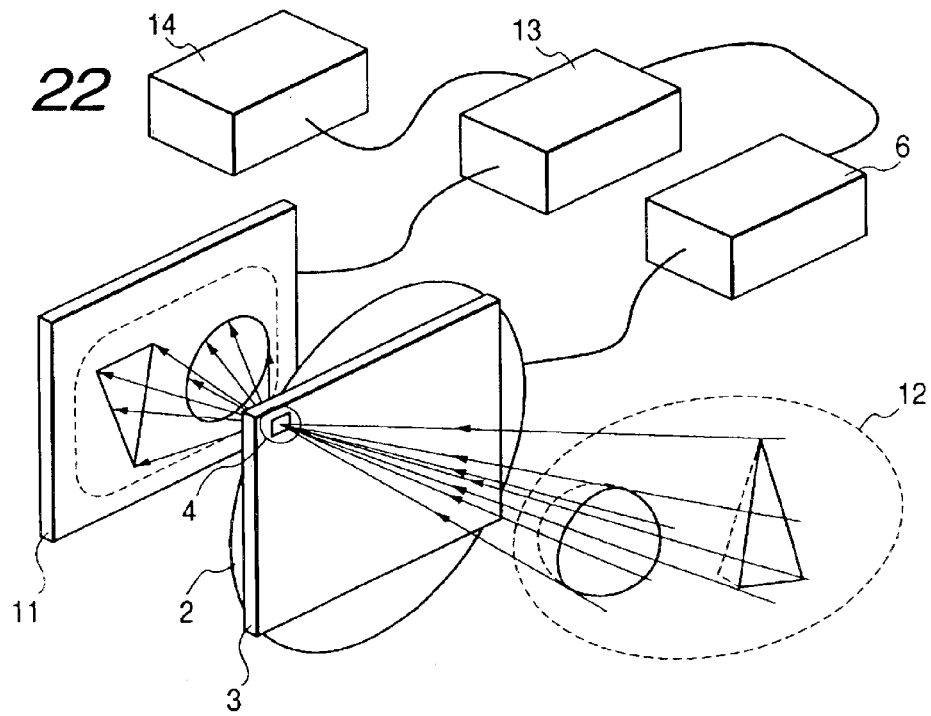
FIG. 22 is a schematic view to show the major part of Embodiment 2 of the 3D object information input apparatus of the present invention.

Next described are the 3D object information input apparatus and method for input of 3D image data for the above 3D image reconstructing apparatus. FIG. 22 is a schematic view to show the major part of the 3D object information input apparatus of the present invention. In the present embodiment the 3D image reconstructing apparatus reconstructs the 3D image by reconstruction of rays as described above. For input of the 3D image data, light from the object is decomposed into many rays and information of the individual rays is recorded. The simplest method as a constructing method of imaging apparatus is a method using an image pickup device 11 instead of the image display 1 in the same structure as that of the 3D image reconstructing apparatus of FIG. 3, as shown in FIG. 22.

In FIG. 22 the imaging apparatus has the optical system 2 and, the pinhole panel 3 driven and controlled by the pinhole control device 6 as in the aforementioned reconstructing apparatus, but the image pickup device 11 is placed instead of the image display 1. The image pickup device 11 is a CCD (solid state image sensing device) or a camera tube. Among the rays coming from the object 12 only the rays passing through the pinhole 4 reach the image pickup device 11 and a set of those rays are picked up as image information. As in the reconstructing apparatus, the pinhole 4 moves at high speed on the pinhole panel 3 and the image information temporally changes according thereto.

The image information thus varying is transmitted as dynamic image information to image pickup device control means 13 to be recorded in dynamic image recording means 14. At this time signals indicating the positions of the pinhole upon image pickup are also recorded simultaneously together with the image information. Upon reconstruction the above image information signals and pinhole position information signals are transmitted to the image control device 5 and the pinhole control device 6, whereby appropriate images and pinholes are formed.

However, if the image information obtained by the above method is displayed on the image display as it is, a 3D image reconstructed will be an inverse three-dimensional image. This phenomenon will be described referring to FIG. 36 and FIG. 37. FIG. 37 is a plan view to show the major part of the 3D object information input apparatus described above. When 3D objects 12 are placed as illustrated, the input apparatus sees the triangular object this side and the circular object that side and receives input of information of the side indicated by dotted lines of the objects 12.

If this information is reconstructed by the reconstructing apparatus arranged in the same configuration as upon input, as shown in FIG. 37, the observer will observe such an image 8 that the objects 12 are observed from the opposite side to the input apparatus. Namely, the observer will observe the triangular object that side and the circular object this side, and the observer will observe the information of the side indicated by the dotted lines, which is the far side from the observer, among the image 8.

Figure 38:
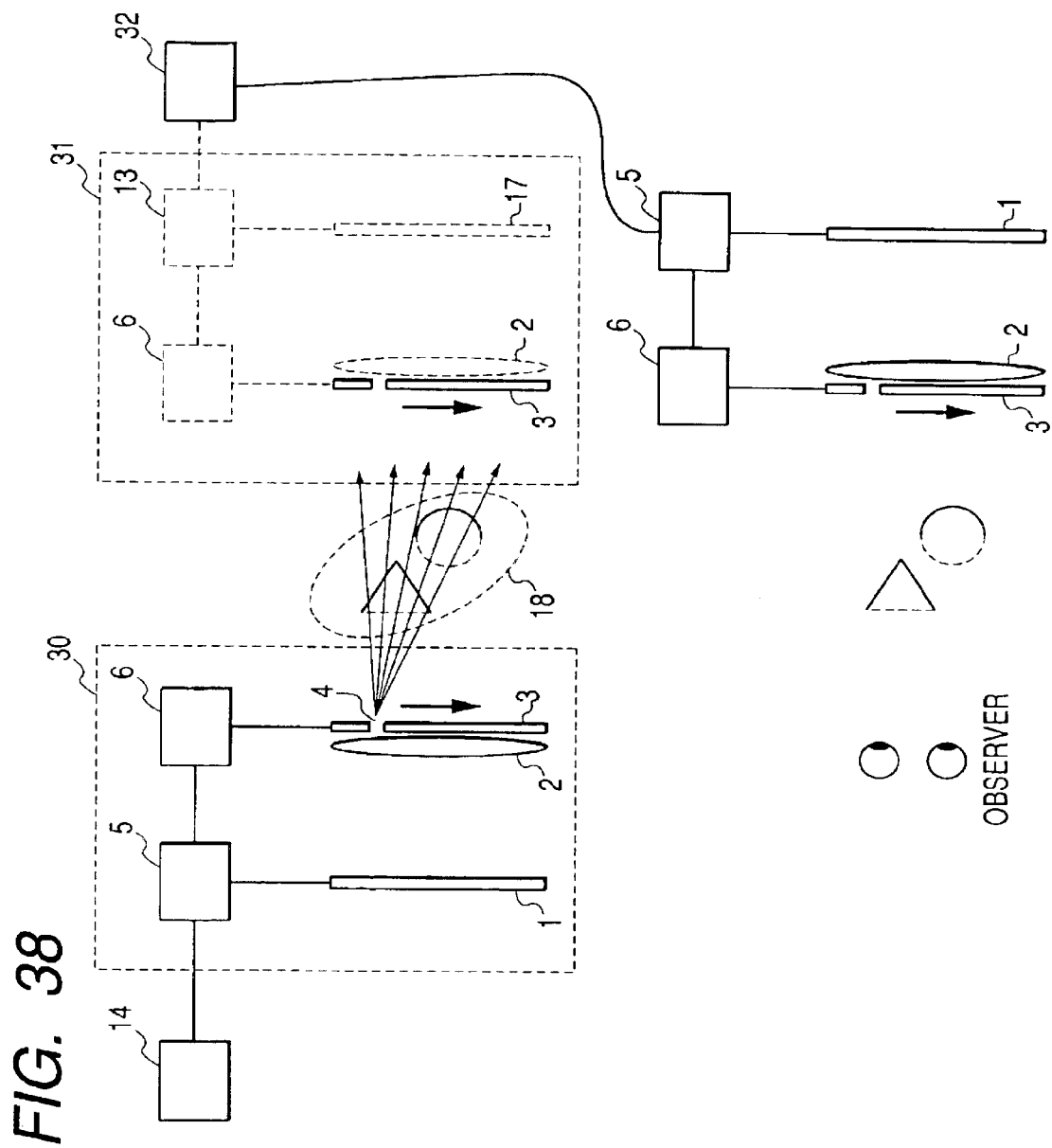
FIG. 38 is an explanatory drawing to illustrate the 3D object information input apparatus and 3D image reconstructing apparatus according to the present invention.

In order to reverse the image in the inverse three-dimensional view state to one that can be observed in a regular three-dimensional view state, the image once turned into the inverse three-dimensional view state is again taken into the 3D object information input apparatus and it is reconstructed by the reconstructing apparatus. It is, however, noted that another 3D object information input apparatus does not have to be prepared and that the image conversion process equivalent to that in the input of object information by use of the 3D object information input apparatus can be virtually performed again in the computer. FIG. 38 shows this method.

Figure 36:
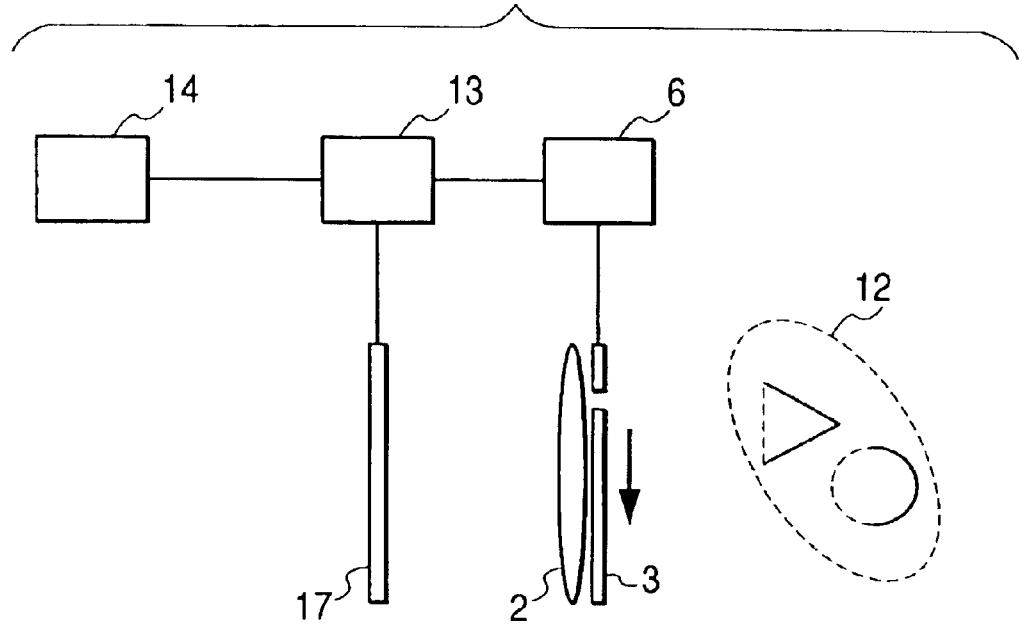
FIG. 36 is a side view to show the major part of Embodiment 2 of the 3D object information input apparatus of the present invention.
Figure 37:
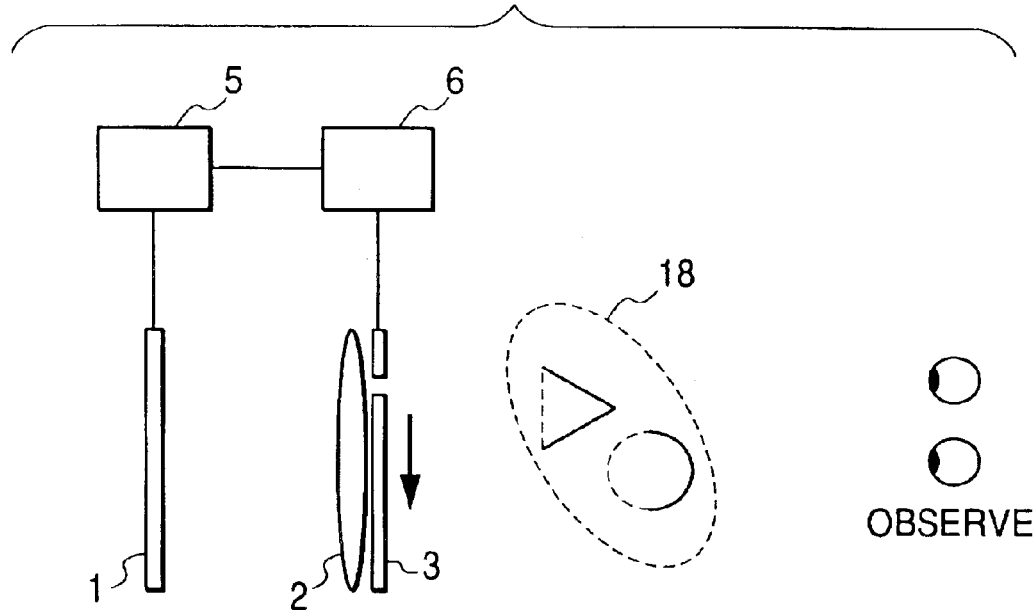
FIG. 37 is a side view to show the major part of Embodiment 2 of the 3D object information input apparatus of the present invention.

The 3D object information entered according to the procedure shown in FIG. 36 is recorded in the form of a set of 2D image information in the dynamic image recording means 14. The computer 32 can obtain the information of all rays forming 3D image 8' reconstructed using a virtual reconstructing apparatus 30, based on these information. (The reason is that as long as the structure of the reconstructing apparatus is known, when some information is displayed on the image display 1 of the reconstructing apparatus, the information of rays outgoing from the pinhole 4 is uniquely determined from the image information, the position information of the pinhole 4, and the characteristic information of the optical system 2.) Once the information of the all rays forming the 3D image 8' is obtained, the dynamic image information obtained by input using the virtual object information input apparatus 31 can also be attained by computation.

Figure 39:
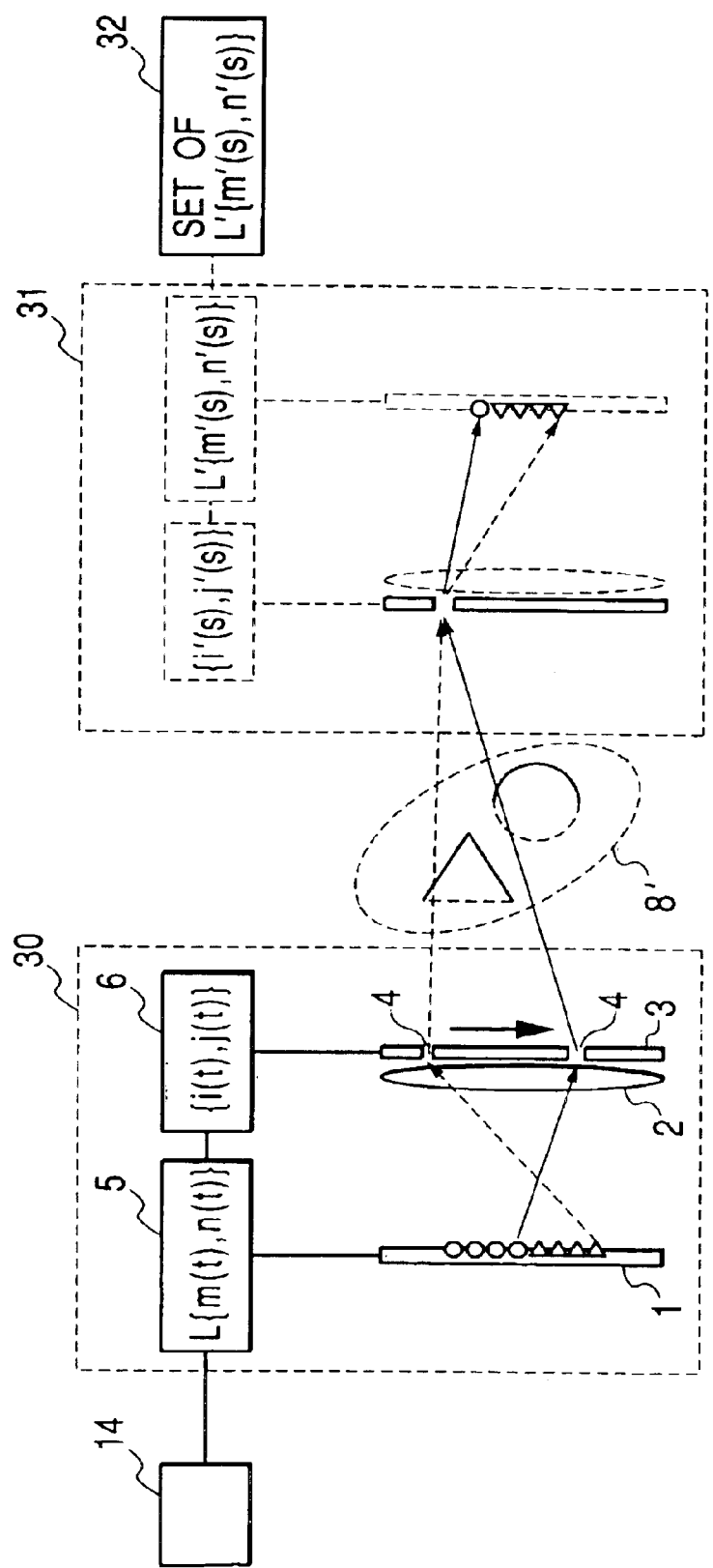
FIG. 39 is a side view to show the major part of Embodiment 2 of the 3D object information input apparatus of the present invention.

There is, however, only one ray simultaneously passing through the pinhole 4 of the virtual reconstructing apparatus 30 and through the pinhole 4 of the virtual object information input apparatus 31 at a certain moment. Therefore, if the pinholes 4 are moved in synchronism, the correct information of 3D image 8' cannot be attained. Accordingly, the correct ray information should be obtained by computation according to the method as shown in FIG. 39.

Coordinates of the position of pinhole 4 of the virtual reconstructing apparatus 30 are two-dimensionally expressed by (i, j) in the plane of the pinhole panel 3. Since these are dependent on the time t, the coordinates are expressed by (i(t), j(t)). Since all luminance information L at coordinates (m, n) in the plane of the image display 1 of the virtual reconstructing apparatus 30 also varies depending upon the time, it is expressed by a function L(m(t), n(t)). A distribution of rays outgoing through the pinhole at the time t is uniquely determined by the distribution of L(m(t), (n(t)) in the plane of the image display 1 and the pinhole position (i(t), j(t)) on the pinhole panel 3.

Letting T be the period in which the pinhole 4 moves throughout the entire area of the pinhole panel 3, the information of the all rays forming the virtual 3D image 8' is also uniquely determined by the distribution of all L(m(t), n(t)) in the plane of the image display 1 and the all pinhole positions (i(t), j(t)) on the pinhole panel 3 in one period T. The virtual object information input apparatus 31 can obtain the desired dynamic image information by obtaining as image information a set of luminance information L'(m'(s), n'(s)) of the rays passing through the pinhole at the position of (i'(s), j'(s)) at a certain moment s and reaching the image pickup device 11 and by repetitively finding all sets of L'(m'(s), n'(s)) in one period T.

When the 3D image is reconstructed by the actual reconstructing apparatus using the thus obtained dynamic image information, the 3D image is a regular three-dimensional image as shown in FIG. 38.

Figure 23:
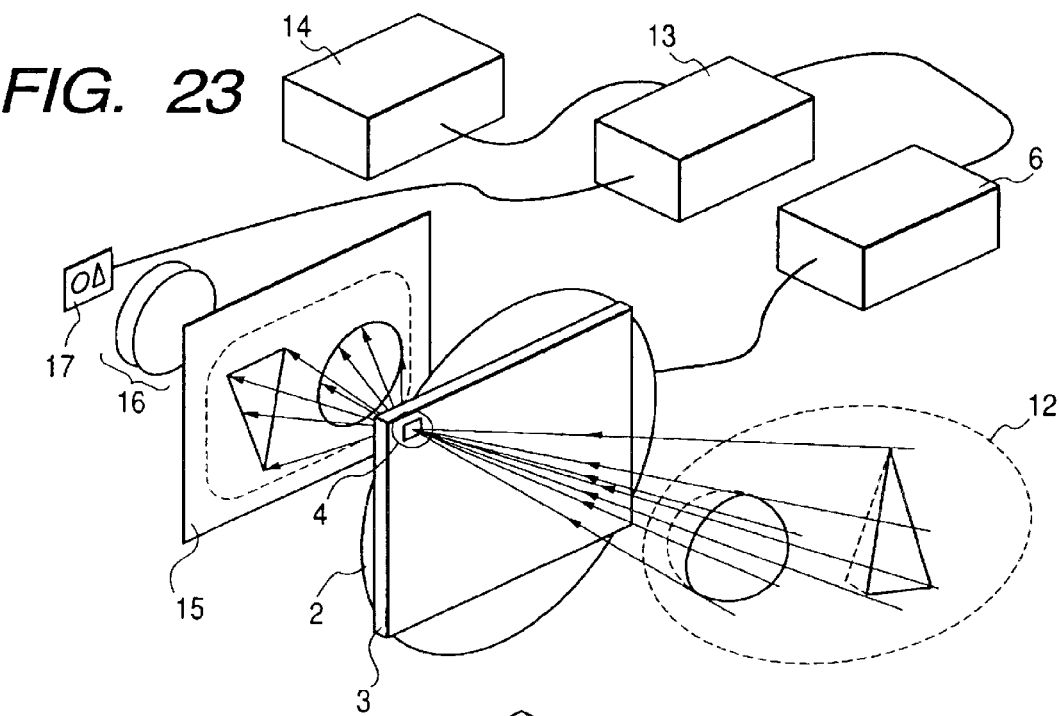
FIG. 23 is a schematic view to show an apparatus obtained by modifying a part of Embodiment 2 of the 3D object information input apparatus of the present invention.
Figure 24:
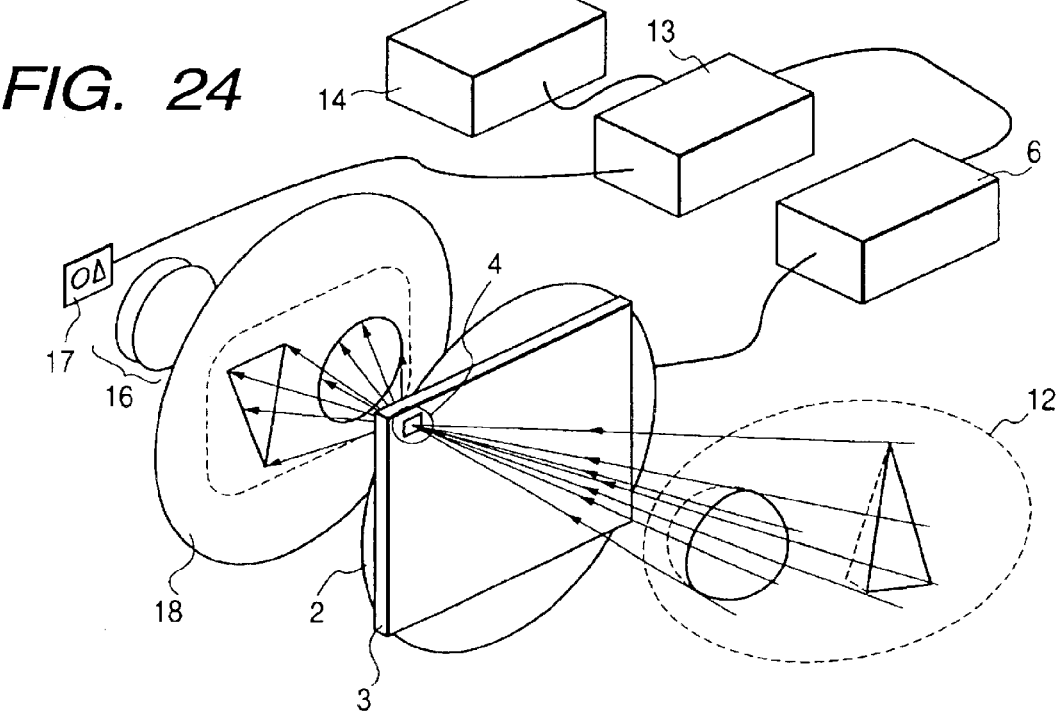
FIG. 24 is a schematic view to show an apparatus obtained by modifying a part of Embodiment 2 of the 3D object information input apparatus of the present invention.

In the above structural example the size of the image pickup device 11 is the same as that of the image display 1, but it can also be contemplated for the cases not permitting use of a large-scale image pickup device, to employ a method for placing a screen 15 on the pickup surface, forming an image once on the screen 15, and inputting the image through pickup optical system 16 into compact image pickup device 17, as shown in FIG. 23. In another arrangement a large-aperture relay lens 18 may be placed instead of the screen 15 as shown in FIG. 24.

Figure 27:
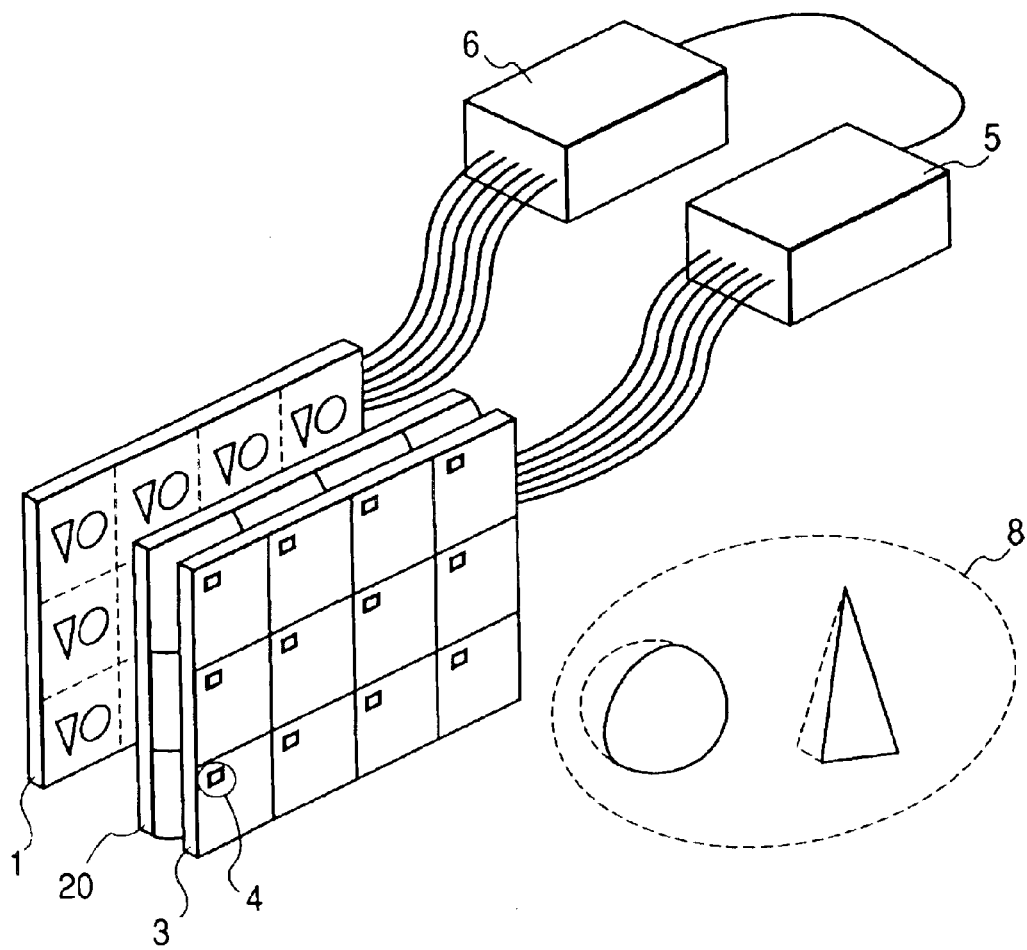
FIG. 27 is a schematic view to show the major part of Embodiment 3 of the 3D image reconstructing apparatus of the present invention.

FIG. 27 is a schematic view of the major part of Embodiment 3 of the 3D image reconstructing apparatus according to the present invention.

Figure 28:
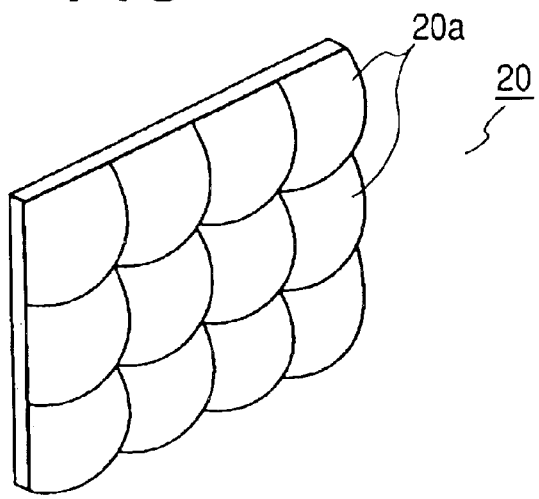
FIG. 28 is an explanatory view to illustrate a part of FIG. 27.

In the present embodiment the frame rate required for the pinhole panel 3 and image display 1 is controlled in a low level by dividing the scan area of the pinhole and the display area of image information. In FIG. 27 the pinhole panel 3 and image display 1 are divided into plural areas, which can be driven independently of each other. Since the adjacent areas of the pinhole panel 3 are continuous, the partition between the areas is not recognized by the observer. Scan of pinhole 4 is carried out in each area in the same manner as in Embodiment 1. Numeral 20 represents an optical system near the pinhole panel 3, which is a lens array 20 as shown in FIG. 28. The position and size of individual lenses 20a of the lens array 20 correspond to those of the separate areas of the pinhole panel 3.

In the same manner as in Embodiment 1, images obtained by reversely projecting the 3D image to be reproduced, through the optical system 20 and through the pinhole 4, are displayed on the image display 1. By this, the number of image information to be displayed on the image display 1 is the same as that of the lenses of the lens array 20 and the pinholes 4. Since each image information exists separately, the division of image display 1 may be discontinuous and the areas of the image display 1 may be separated from each other. The image control device 5 and pinhole control device 6 are those for controlling the image information of the respective areas and the pinholes in parallel and independently of each other. It is also permissible to prepare separate control devices 5, 6 in the same number as the number of divided areas and to control them all in parallel connection.

The first merit of the division into the areas is to keep low the frame frequency required for the pinhole panel 3. This is because the scan area of pinhole is decreased and the number of pinholes to be formed within the fixed period is decreased.

For example, in the case wherein the scan period of pinhole is 1/30 sec and the pinhole is formed in the resolution of 1 mm to scan the pinhole panel of 150 mm long and 200 mm wide, the frame rate required for the panel in order to scan the entire surface of panel is 900 kHz. In contrast, in the case wherein this pinhole panel is divided into twelve areas of 50 mm long and 50 mm wide in the array of three vertical areas and four horizontal areas, the frame rate required for the pinhole panel in order to scan each area can be decreased to 75 kHz.

Accordingly, if the areas of the pinhole panel can be controlled in parallel, the frame rate required for the whole of the pinhole panel can also be set to be 75 kHz. Of course, the pinhole may be replaced by the slit as described in Embodiment 1, which can achieve the effect to further decrease the frame rate.

The second merit of the division into areas is to shorten the depth of the apparatus body. Since the focal length of the individual optical systems arrayed can be shorter than that of the optical system of Embodiment 1, the distance from the optical system to the image display can also be shortened in the case of the division into areas, and the depth of the entire apparatus can be shortened accordingly.

Figure 29:
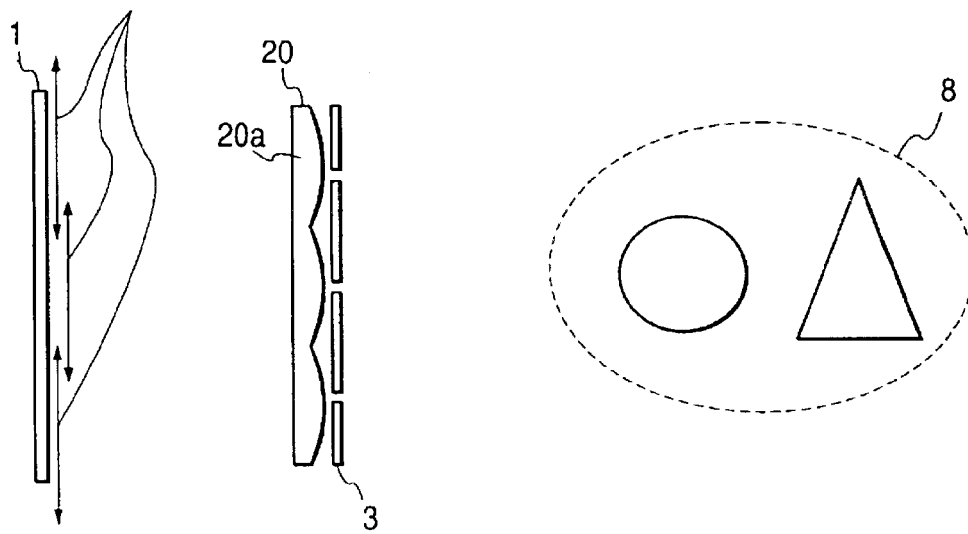
FIG. 29 is a side view to show the major part of a portion of FIG. 27.

It is, however, noted that the array configuration of optical systems does not always separate the image information. Reversely projected images of the 3D images a to c to be displayed on the image display 1 are separated; but, for example in the case wherein the magnifications of the individual lenses 20a are small as shown in FIG. 29, adjacent reversely projected images interfere with each other on the image display 1. This does not allow the 3D image to be reconstructed well.

Figure 30:
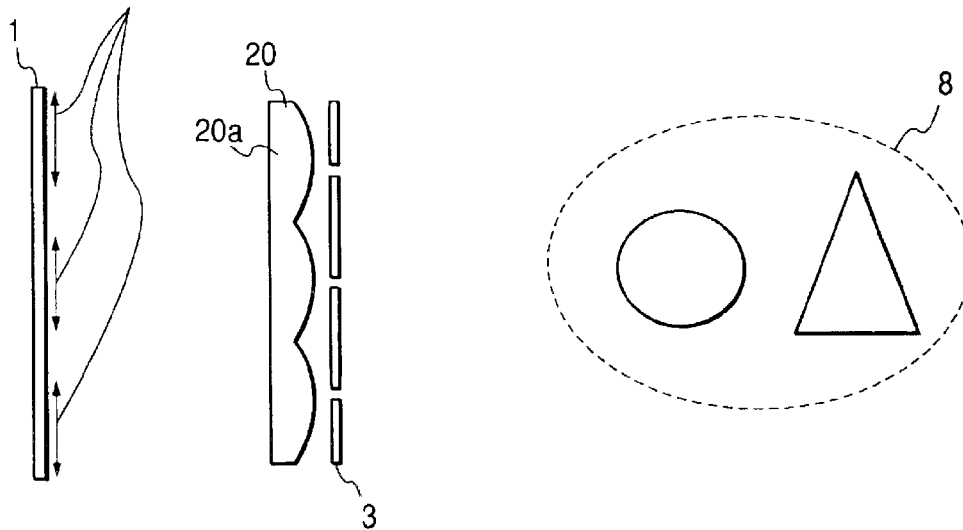
FIG. 30 is a side view to show the major part of a portion of FIG. 27.
Figure 31:
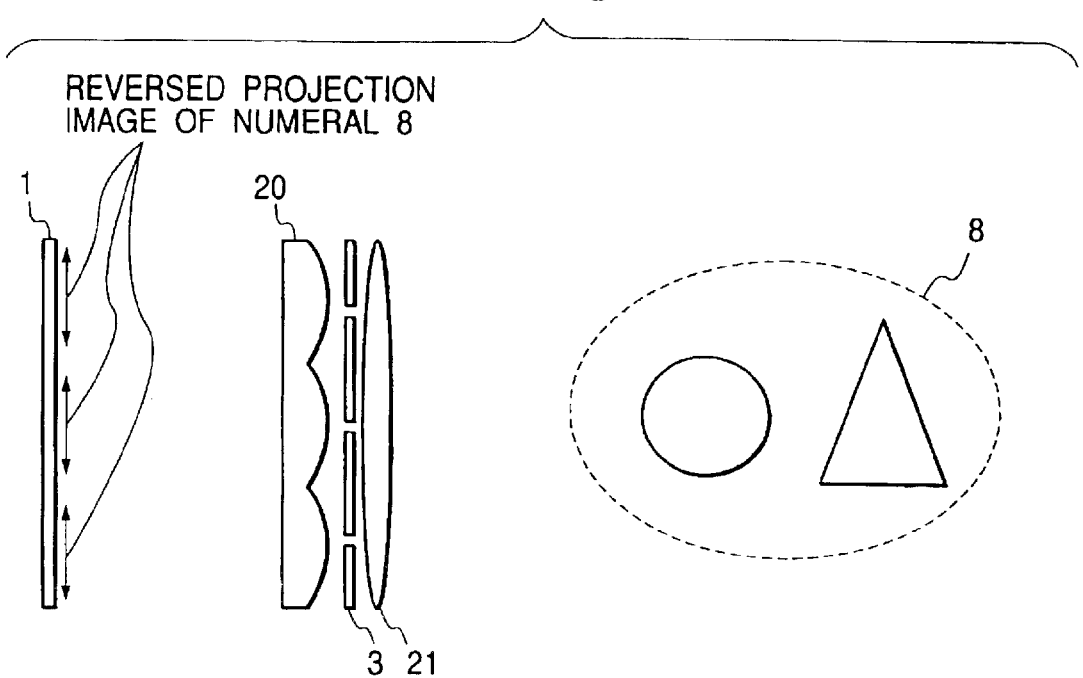
FIG. 31 is a side view to show the major part of a portion of FIG. 27.

In the present embodiment the focal length of the lenses 20a is thus set so as not to cause the reversely projected images to interfere with each other, as shown in FIG. 30. In another arrangement as shown in FIG. 31, the lens array 20 is combined with a convex lens (positive lens) 21, thereby preventing the surround magnification of the reversely projected images of the 3D image from increasing and also preventing the existing ranges of the reversely projected images from projecting out from the image display 1. In this case, the segments of the image display 1 can be formed in the identical area and the magnifications of image information to be displayed on the respective areas can be set equal. Of course, the lens array 20, the convex lens (positive lens) 21, and the pinhole panel 3 may be arranged in an arbitrary order.

Figure 32:
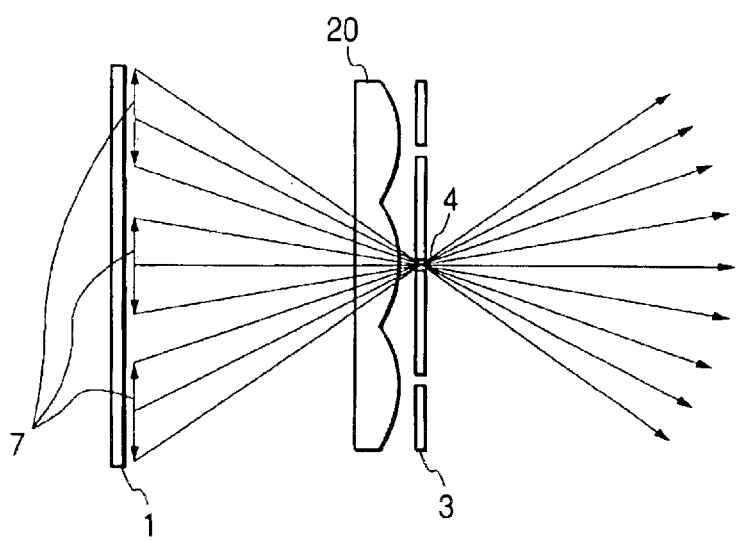
FIG. 32 is a side view to show the major part of a portion of FIG. 27.
Figure 33:
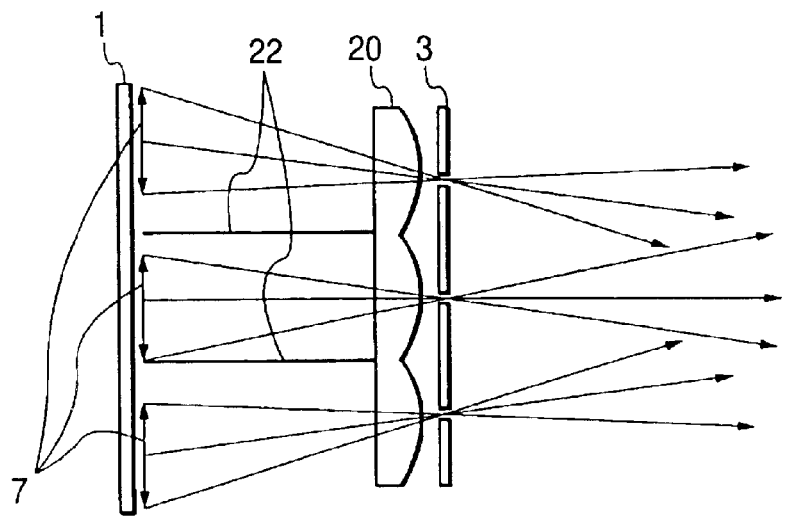
FIG. 33 is a side view to show the major part of a portion of FIG. 27.

Further, in the arrangement of the division into the areas, there may occur cases in which plural image information beams pass through one pinhole 4 as shown in FIG. 32. In order to prevent it, light-intercepting partitions 22 for partitioning the divisional areas from each other are provided between the pinhole panel 3 and the image display 1 as shown in FIG. 33.

Figure 34:
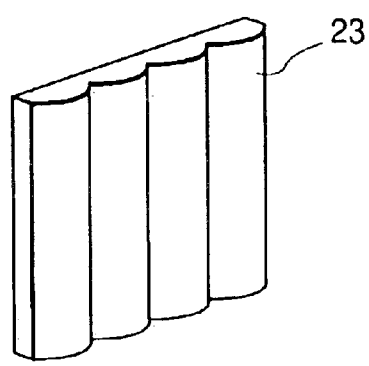
FIG. 34 is an explanatory drawing where a portion of FIG. 27 is modified.
Figure 35:
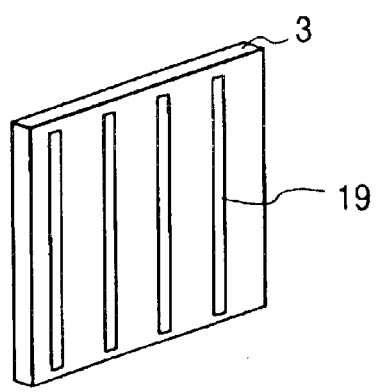
FIG. 35 is an explanatory drawing where a portion of FIG. 27 is modified.

When the pinhole is replaced by the slit in the configuration of the division into areas, the lens array may be a lenticular lens 23 in which a plurality of cylindrical lenses are arrayed as shown in FIG. 34, and the aperture portions on the pinhole panel 3 may be a plurality of slits 19 as shown in FIG. 35.

In the 3D image information input apparatus for the reconstructing apparatus of the present embodiment, the image pickup device, optical system, and pinhole panel all are divided into areas in the same manner, and they are placed and controlled in the same manner.

As detailed above, the present invention of the first aspect can achieve the 3D image reconstructing apparatus that permits the observer to observe the 3D image in a natural state and without strain, by setting the respective elements as described above, and can also achieve the 3D object information input apparatus that can obtain the 3D object information from an actually existing object and record the information by the simple structure.

The second aspect described previously will be described below.

Figure 40:
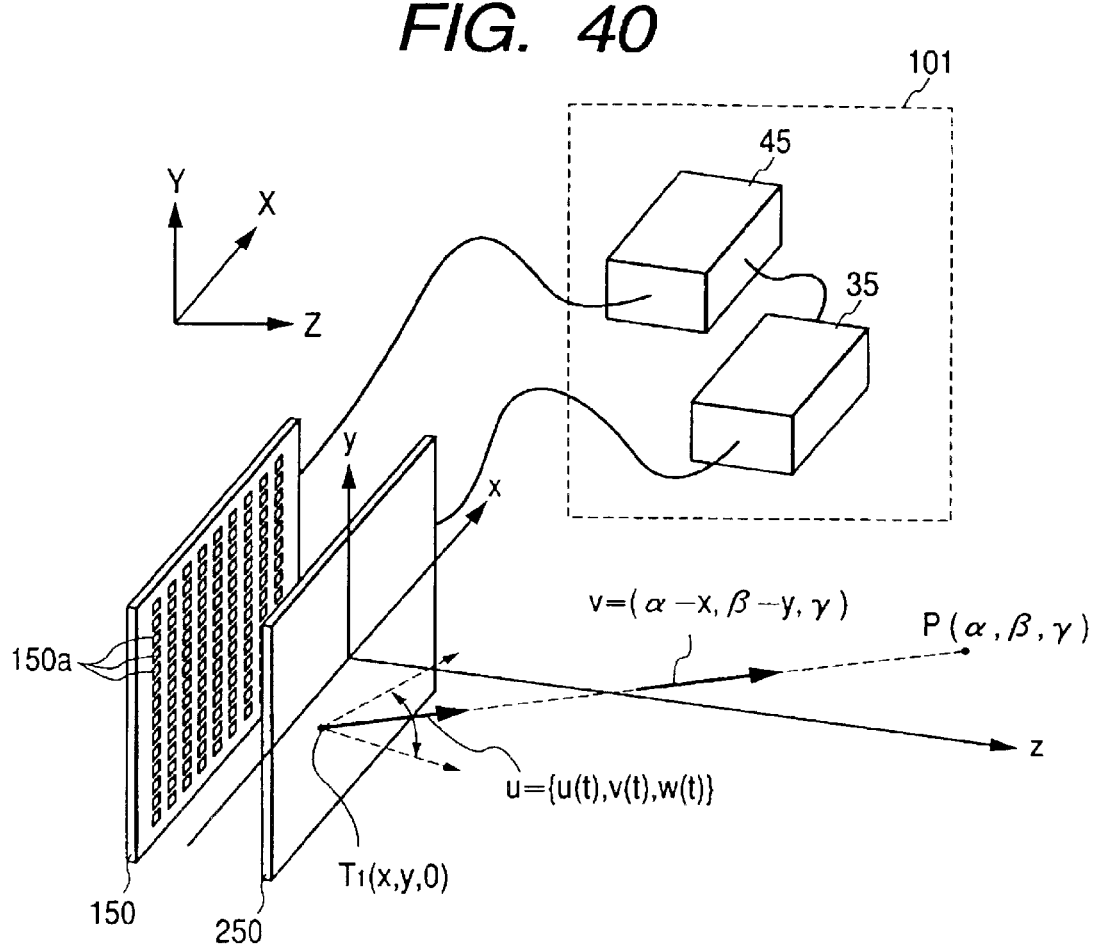
FIG. 40 is a schematic view to show the major part of Embodiment 2 (configuration B) of the present invention.

FIG. 40 is a schematic view to show the major part of the 3D image reconstructing apparatus of the present invention. In the drawing reference numeral 150 designates a light source array having a plurality of light source portions 105a for radiating rays with single directivity, which is, for example, an LED light source array with microlenses or a visible region laser diode array.

The light source portions 105a are placed independently of each other on a 2D plane and are small-diameter beam control means which radiate parallel light or a small-diameter beam having single directivity, equivalent thereto. Numeral 250 denotes ray emission direction control means, which has a function to deflect the all small-diameter light beams emitted from the respective light source portions 10a of the light source array 150 independently into an arbitrary direction very quickly.

The all light beams emitted from the light source array 150 are incident into the ray emission direction control means 250. The light source portions 10a of the light source array 150 are two-dimensionally located and the light source array 150 are driven independently of each other. When the coordinate axes are defined on the XY plane residing on the ray emission direction control means 250 as illustrated, the intensity of a light beam at an intersecting point between an arbitrary light beam and the ray emission direction control means 250 can be expressed as $\psi(x, y, 0)$.

The direction of emission of light beam deflected by the ray emission direction control means 250 varies in very short period T and is expressed by a direction vector of this light beam at time t, as defined below.

$$u=\{u(t), v(t), w(t)\}$$

Next described is a method for reconstructing an arbitrary point image P in the 3D space by the above configuration. When the position of the point image P is at $(\alpha, \beta, \gamma)$, a direction vector of a ray emitted from an arbitrary point $T_1(x, y, 0)$ on the above ray emission direction control means 250 and passing the point P can be expressed by the following vector.

$$v=(\alpha-x, \beta-y\gamma)$$

Such a ray can be generated by making the light source array 150 radiate a light beam to pass the point $T_1(x, y, 0)$ on the XY plane at such time t that the vector u indicating the direction of emission of the ray deflected by the ray emission direction control means 250 becomes as follows.

$$u=s \cdot v (s \text{ is a rational number})$$

Detection of the time t is executed by ray emission direction detecting means 35 for detecting the status of the ray emission direction control means 250 and lighting (on) of the light source array 150 is executed by light source array control means 45 in response to a signal from the ray emission direction detecting means 35. The above operation is carried out throughout the entire region of the XY plane within the ray deflection period T of the ray emission direction control means 250.

The ray emission direction detecting means 35 and light source array control means 45 compose elements of control means for carrying out various vibration controls. The ray deflection period T is set smaller than the permissible time of afterimage of human eye (about $\frac{1}{30}$ to $\frac{1}{60}$ sec), so that the observer observing a set of rays passing the point P, at a position behind the point P, can recognize as if these rays are generated simultaneously and as if a beam with spread is diverging from the point P, thereby three-dimensionally observing the point image P floating in the space.

However, in order that the point image P is recognized as a 3D image, the diameter of the individual beams for reconstructing the point image P and the array pitch of the light source portions 10a of the light source array 150 must satisfy a certain condition.

According to the principle of reconstruction of 3D image of the present invention, each of the all point images reconstructed is expressed as an intersecting point among plural light beams. Therefore, in order to recognize each point image, at least two beams must enter the observer's pupil. Since the diameter of the pupil of human eye is approximately 2 mm to 7 mm, the above beam diameter is first not larger than the pupil diameter, desirably, not more than the diameter 2 mm.

Figure 41:
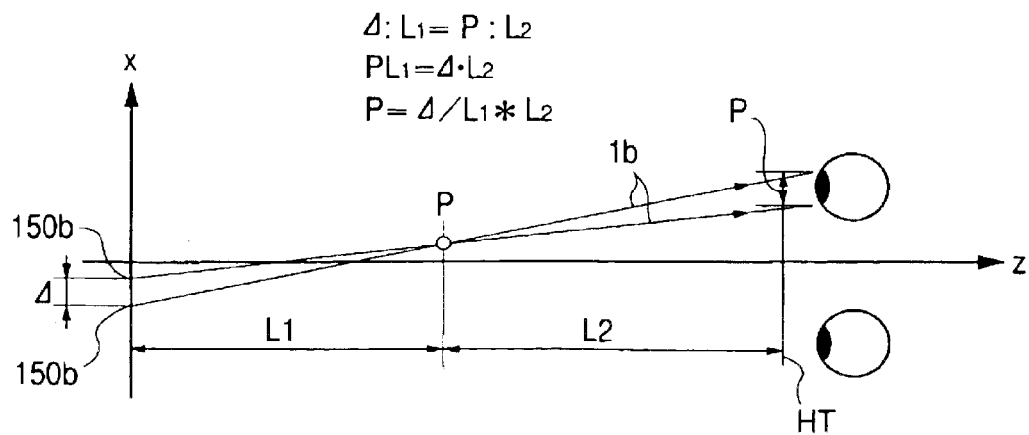
FIG. 41 is an explanatory drawing to show optical paths of rays in a portion of FIG. 40.

In order to assure that at least two beams are incident into the observer's pupil, the distance between adjacent beams needs to be small to some extent. Considering this geometrically, the positional relation as shown in FIG. 41 needs to be taken into account. Namely, letting Δ be the distance between adjacent beams 150b on the XY plane, L1 be a distance from the XY plane to the point image P, and L2 be a distance from the point image P to the position of the observer's pupil HT, a distance p between the beams 150b at the position of observer's pupil HT is expressed as follows.

$$p=(\Delta/L1)*L2$$

Therefore, as long as the distance p between beams is not more than 2 mm, two or more beams are incident into the observer's pupil.

This condition is satisfied in the entire range of the XY plane by the all point images reconstructed and at the all observation positions of observer expected, whereupon the observer can recognize the reconstructed image at the point P shown in FIG. 40, as a 3D image.

Figure 42:
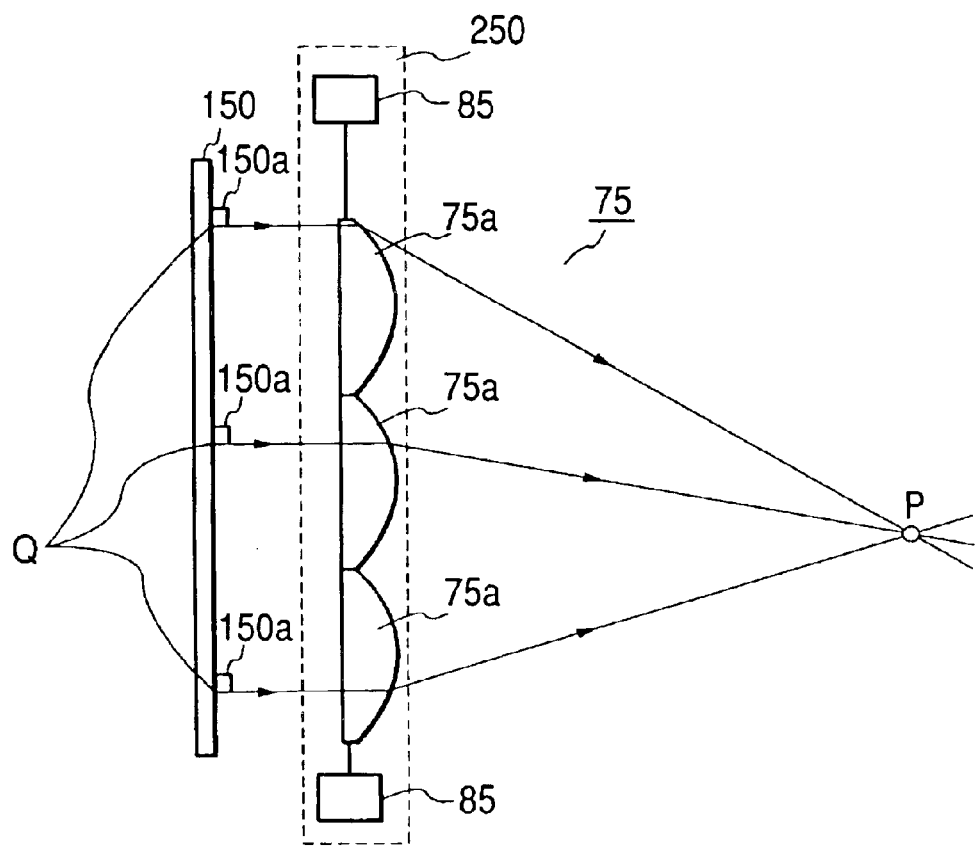
FIG. 42 is an enlarged explanatory drawing of a portion of FIG. 40.

The above point image reconstructing method will be described in further detail (and consideration will be given only on the direction of ray in the horizontal direction, for brevity of explanation). FIG. 42 is a plan view to show the major part of the 3D image reconstructing apparatus according to the present invention.

Figure 43:
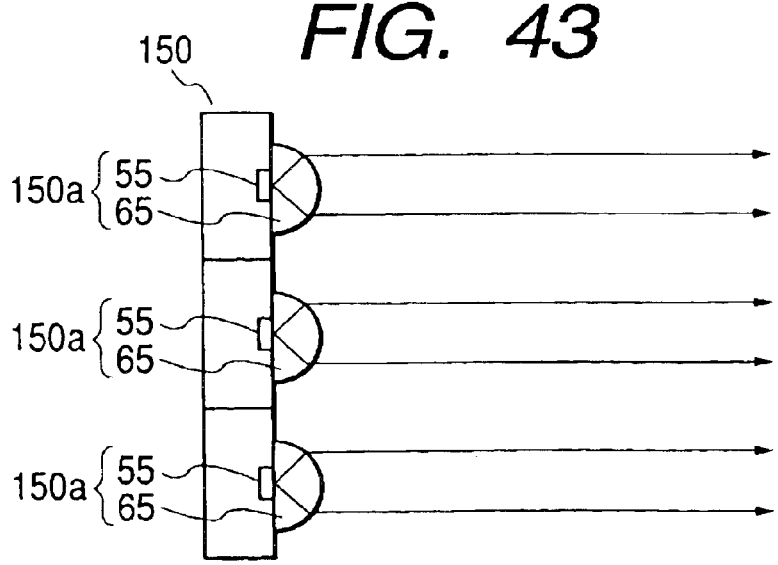
FIG. 43 is an enlarged explanatory drawing of a portion of FIG. 40.

The light source array 150 for radiating rays with single directivity always emits parallel rays normal thereto, toward the ray emission direction control means 250 (the XY plane). FIG. 43 is an explanatory drawing to illustrate the light source array 150 for radiating such rays with single directivity. In the drawing numeral 55 denotes radiative portions of small light emitting devices such as LEDs, laser diodes, or EL elements. Numeral 65 represents collimator lenses (condenser lenses) placed on the front surface of these radiative portions 55, which have the function to convert light emitted from the radiative portions 55 into a parallel beam and to shape the beam. Each light source portion 150a is composed of a combination of a radiative portion 55 with a collimator lens 65. The light source array 150 is comprised of a two-dimensional array of the light source portions 150a for radiating parallel rays.

On the other hand, the ray emission direction control means 250 deflects the parallel rays from the light source array 150 repetitively and quickly in the fine period T.

Figure 44:
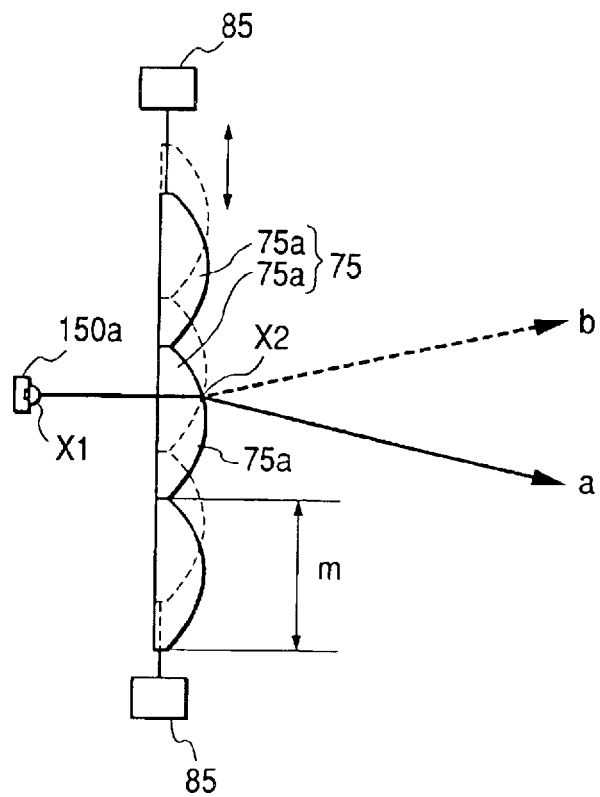
FIG. 44 is an enlarged explanatory drawing of a portion of FIG. 40.

FIG. 44 is an explanatory drawing to explain the operation of such ray emission direction control means 250. In the drawing, reference numeral 75 designates a microlens array. The size of individual microlenses 75a is sufficiently greater than the diameter of the individual beams emitted from the above light source portions 150a. This microlens array 75 is vibrated at very high speed by means of high-frequency vibrating means 85 comprised of a piezo device or the like. The amplitude of the microlens array 75 is equal to the size m of one microlens 75a.

Supposing that at a certain time the microlens array 75 is located a t the position of the solid lines in the drawing, a parallel beam emitted from a radiative point X1 of a light source portion 150a is deflected into a direction a at point X2 of the microlens 75a. However, supposing that at another time the microlens array 75 is moved to the position of the dotted lines in the drawing, even the parallel beam from the same light source portion 150a changes its ray deflection direction into another direction b in the drawing.

In the present embodiment the parallel beams are deflected into various directions within short time by use of the means having the above-stated structure.

Next described is a method for reconstructing an arbitrary point image P in the 3D space where the apparatus of the above-stated structure is used in FIG. 42.

In order to reconstruct rays passing the point P at a certain time t, the light source portions 150a to be turned on need to be selected out of the light source array 150 in accordance with the status of the ray emission direction control means 250 at that time. Since the all beams outgoing from the individual light source portions 150a are parallel beams and normal to the XY plane, the light source portions to be turned on are determined to be the light source portions 150a located at such points Q that when the rays are reversely traced from the point P, the rays reach the light source array 150 normally to the XY plane through the ray emission direction control means 250 at that time.

There are a plurality of such positions of the light source portions 150a for one point image in the above structure. By simultaneously turning such light source portions 150a all on and by selectively turning the light source portions on in the same manner at other times within the short period T, all rays converging at the point P can be generated, whereby the observer can recognize the rays as a point image P.

However, if a lighting range of the light source portions is limited so as to give a two-dimensional distribution of intensity of light beam on the XY plane, the directivity of beams for reconstructing the point P can also be expressed.

Figure 45:
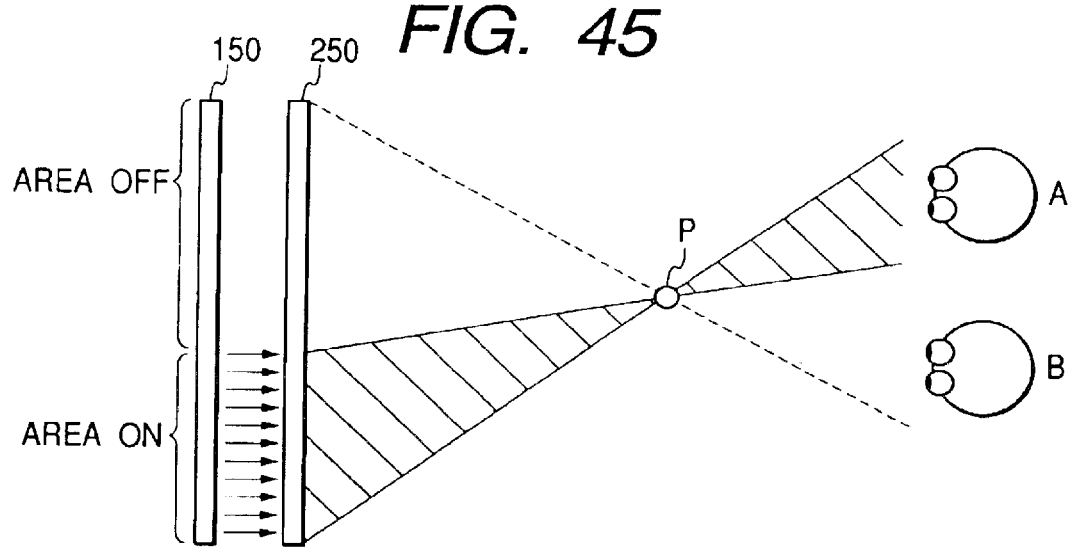
FIG. 45 is an explanatory drawing to illustrate the operation of a portion of FIG. 40.

FIG. 45 is an explanatory drawing to illustrate this method. When the all rays for reconstructing the point P are reconstructed, the point image P is observed by both observer A and observer B. However, if the light source array 150 is set to have an on area where plural light source portions are on and an off area where plural light source portions are off, i.e., if radiation states of the light source array are controlled, the light for reconstructing the point image P will be light with such directivity as to be observed by only the observer A.

The description of FIG. 45 concerned the method for reconstructing one point image P within the ray deflection period T, but the present apparatus can reconstruct plural point images within the ray deflection period T.

Figure 46:
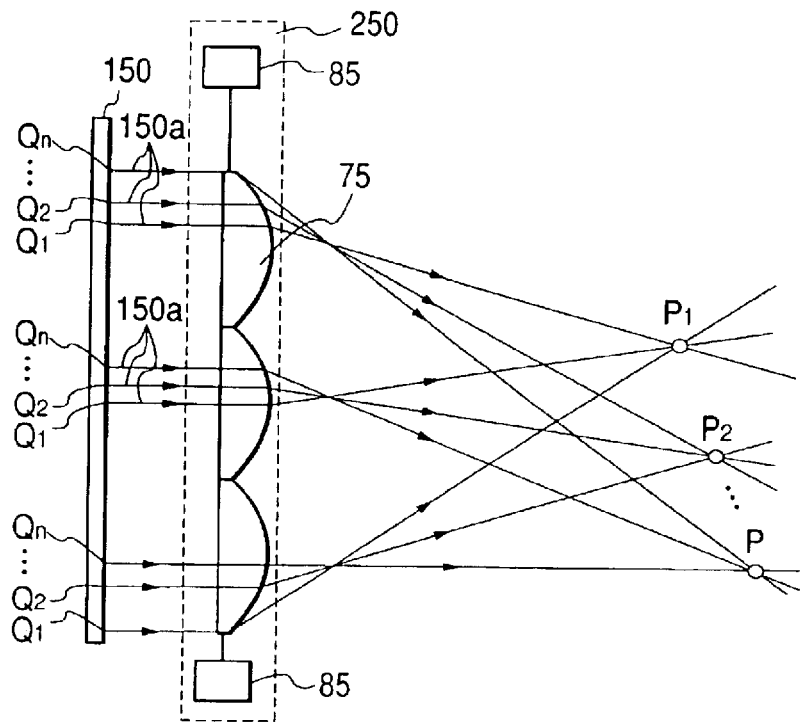
FIG. 46 is an explanatory drawing to illustrate the operation of a portion of FIG. 40.

FIG. 46 is an explanatory drawing to illustrate the case wherein plural point images $P_1$, $P_2$, $P_3$, . . . , are reconstructed. In FIG. 46, when there are a plurality of point images to be reconstructed, $P_1$–$P_n$, the rays are reversely traced from the all point images $P_1$, $P_2$, . . . in the same manner as in the case for reproducing one point image; positions of light sources to be turned on are determined to be the light source portions 150a corresponding to points $Q_1$ to $Q_n$ at which the rays reach the light source array 150 normally to the XY plane through the ray emission direction control means 250 at that time.

The light source portions are also selectively turned on in the same manner at the other times within the short period T, whereby the observer can recognize the rays as point images $P_1$ to $P_n$. Similarly, in the case wherein the directivity is given to the reconstructed beams of the respective point images, lighting of the light sources is also controlled under such consideration that a two-dimensional distribution of intensity of light beam on the XY plane becomes a distribution expected.

Figure 47:
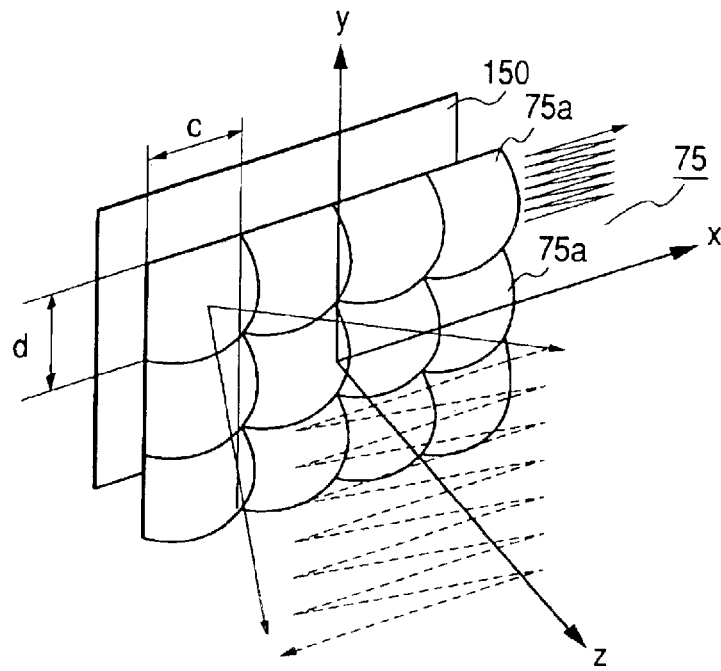
FIG. 47 is an explanatory drawing to illustrate the driving of the microlens array of FIG. 46.
Figure 48:
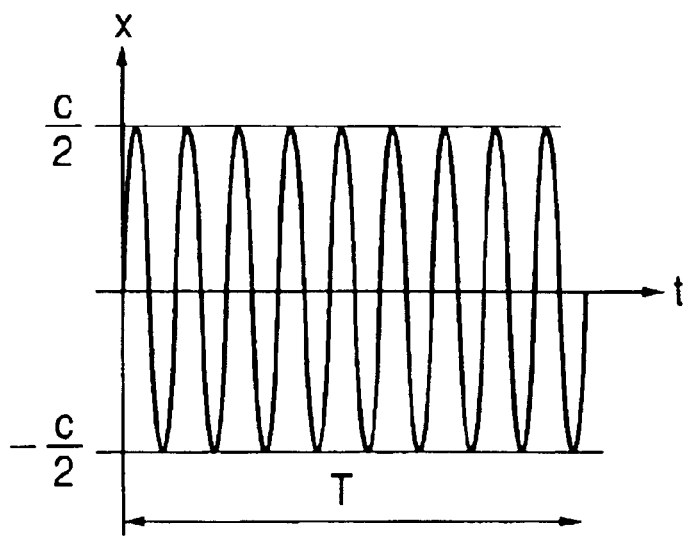
FIG. 48 is an explanatory drawing to illustrate a displacement amount of the microlens array of FIG. 46.
Figure 49:
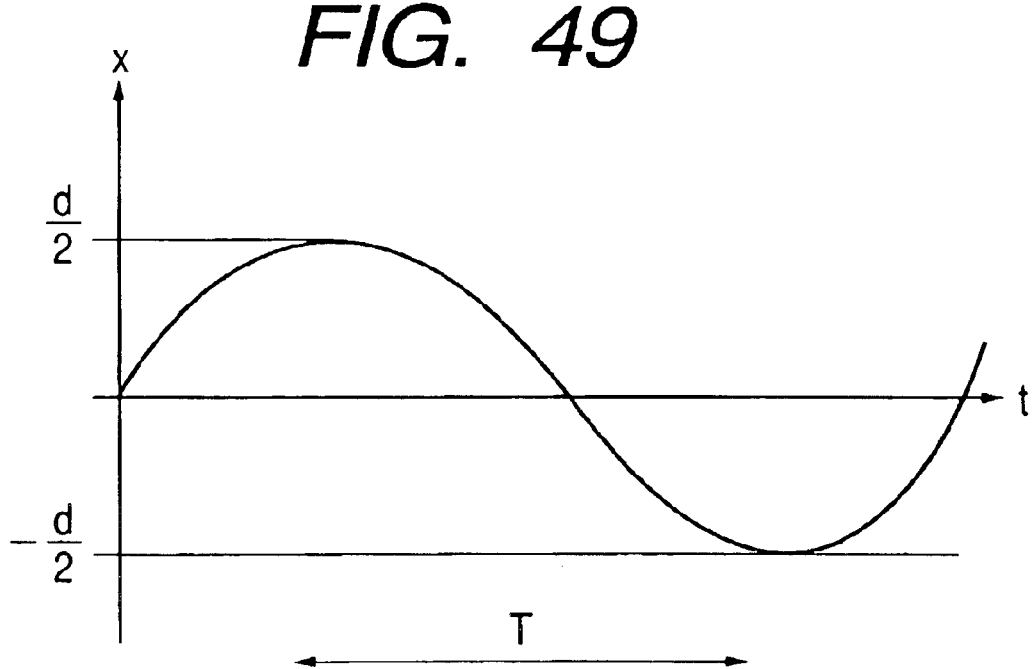
FIG. 49 is an explanatory drawing to illustrate a temporal change in the displacement amount of the microlens array of FIG. 46.

Next described is a method for driving the ray emission direction control means 250. FIG. 47 is a conceptual drawing to illustrate driving of the microlens array 75 and vibration of ray caused thereby, and FIG. 48 and FIG. 49 are graphs to show temporal changes of displacement amount of the microlens array 75.

While the microlens array 75 moves by one pitch d of element lens 75a in the y-direction during a unit time T, reciprocal motion with amplitude c is repeated in the x-direction. This causes the microlens array 75 to move in a zigzag pattern, whereupon the ray also scans in a zigzag pattern. If the period of the reciprocal motion in the x-direction is short, an angle of deflection of the ray may take almost any desired value. This forms the means for controlling the ray emission direction on a two-dimensional basis.

The present method is desirably arranged to be capable of deflecting the rays on the two-dimensional basis as described above, but the vertical parallax of reconstructed image can be cut to limit the scan direction of ray to the horizontal direction from the point such as decrease in information amounts or decrease in the driving speed of the ray emission direction control means 250.

Figure 50:
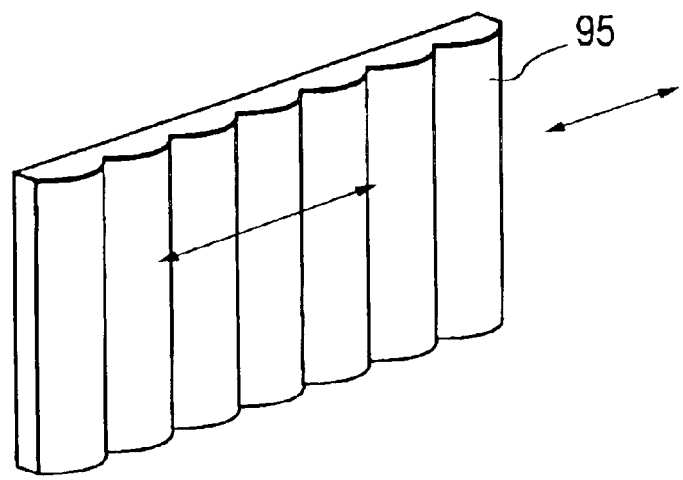
FIG. 50 is an explanatory drawing to show a part of the ray emission direction control means of FIG. 40.

In this case a lenticular lens 95 as shown in FIG. 50 is used as the ray deflecting means in place of the microlens array 75 and this lenticular lens 95 is subjected to the reciprocal motion only in the horizontal direction as indicated by the arrow.

The light source array 150 and the ray emission direction control means 250 do not always have to be separated from each other, but one may also function as the other. For example, in the structure using the microlens array 75, the deflection of ray can be achieved as long as the relative positional relation changes between the microlens array 75 and the light source array 150.

Figure 51:
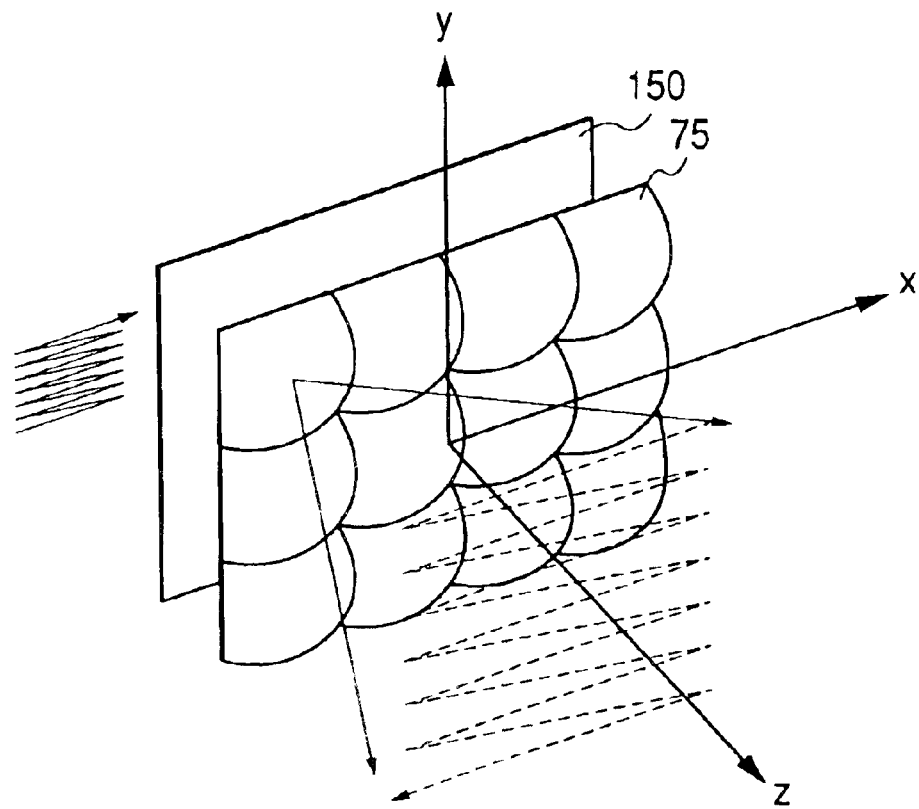
FIG. 51 is an explanatory drawing to illustrate a portion of FIG. 40.

FIG. 51 is an explanatory drawing to illustrate such a structure that the microlens array 75 is fixed while the light source array 150 is vibrated by vibrating means (not illustrated), as described above, so as to play the role of deflection of ray as well. Another method may be such that the light source array 150 and the ray emission direction control means 250 are arranged separately for x-vibration and for y-vibration, respectively, thus dividing charges for deflection of ray.

Next described is a method for efficiently reconstructing the 3D image by use of the present apparatus. The present apparatus expresses a 3D image in the form of a set of point images. When the simplest reconstructing method is used, $(m \cdot n)^3$ points are reconstructed in order to reconstruct a cube the length of each side of which is m and the resolution of each side of which is n.

However, since the present apparatus can express the directivity of beam as described above, the number of point images to be reconstructed can be minimized by making use of it well and the hidden-surface process (which is such a process that an image not observed by the observer is omitted) can also be carried out in the reconstructed image.

Regarding as a method for reconstructing the $(m \cdot n)^3$ points, FIGS. 11 to 19 and the description for explaining about the FIGS. 11 to 19 for the embodiment of the configuration A can also be applied to that of the configuration B. Therefore, the explanation for the method is omitted here.

Namely, the hidden-surface process of 3D image reconstructed is carried out by applying such image reconstruction by the method as same as the method for the embodiment of the configuration B which has been already explained to the all emission points on the ray emission direction control means 250.

The embodiments described above showed typical construction examples in the present invention, but the components of the apparatus can be modified as described below, thereby achieving enhancement of performance and other facilities.

Figure 52:
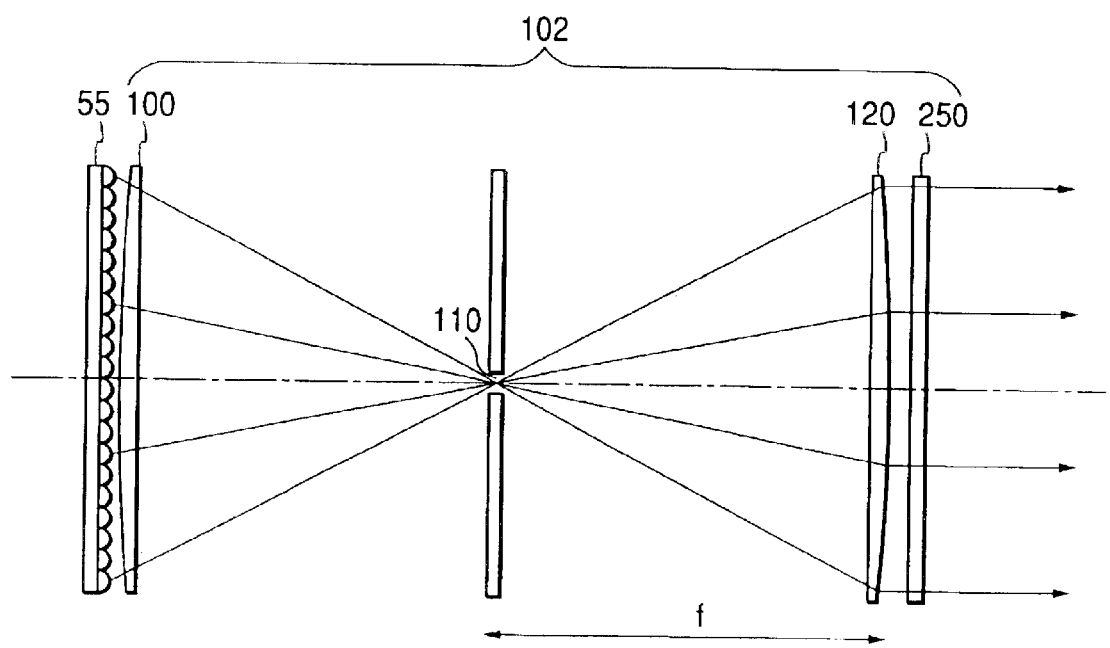
FIG. 52 is an explanatory drawing to show an improvement in a portion near the ray emission direction control means of FIG. 40.

(a-1) Light source array 150 for emitting rays with single directivity:

For generation of single directivity of ray, a telecentric optical system 102 as shown in FIG. 52 can be used as the light source array 150. Matrix light source portions 55 such as LEDs each emit diverging light, and these diverging light is converged to near the center of optic axis by field lens 100. Then only light passing through pinhole 110 can be used as a light source portion, and the light is converted into parallel rays with single directivity by lens 120 located the focal length f apart from the pinhole 110.

Figure 53:
FIG. 53 is an explanatory drawing to show the microlens array of the ray emission direction control means of FIG. 40.

(a-2) Ray emission direction control means 250:

Since the above-stated microlens array 75 has the discontinuous border portions between the lenses 75a, the change of emission direction of ray becomes discontinuous even if the microlens array 75 is displaced continuously. If the microlens array is replaced by a wave-shaped lens array 710 in which the cross section of lens is of a wave form and in which borders between individual lenses are continuous as shown in FIG. 53, continuity can also be kept for the change of emission direction of ray.

The deflecting means of ray can be an optical element except for the lenses. For example, the same apparatus in the above embodiments can be constructed by using an optical element for deflecting light by diffraction, such as a diffraction grating or a hologram, and by vibrating it quickly.

Further, the ray emission direction control means can also be constructed of an element that actively changes angles of refraction of ray or angles of reflection, such as a VAP (variable apical angle prism) or a DMD element.

(a-3) Other configurations

Figure 54:
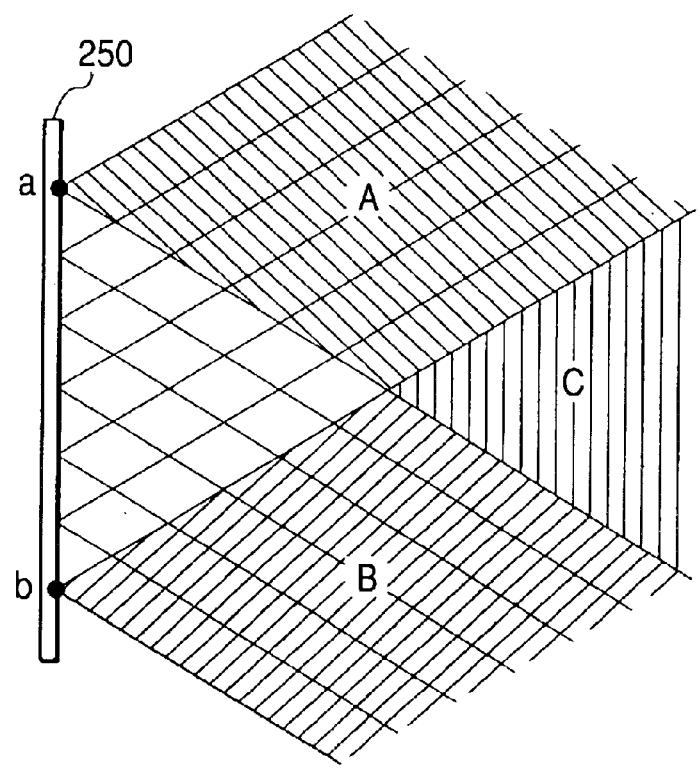
FIG. 54 is an explanatory drawing to illustrate the ray emission direction control means of FIG. 40.
Figure 55:
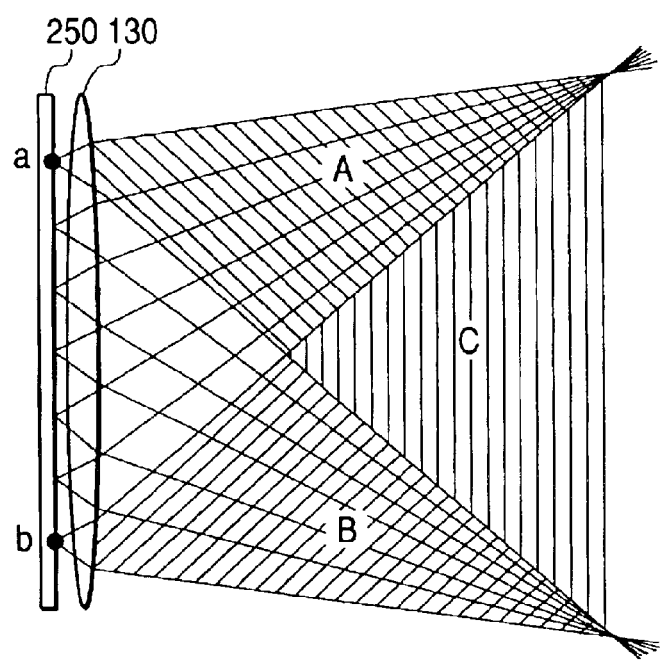
FIG. 55 is an explanatory drawing to illustrate the ray emission direction control means of FIG. 40.

In the structure of the aforementioned embodiments, the range A and range B of emission direction of ray at the point a and point b on the ray emission direction control means 250 are those indicated by oblique lines in the drawing, as also seen from FIG. 54, and a region that both rays from the point a and rays from the point b reach is a range C indicated by vertical lines in the drawing. In contrast, if a refracting member, for example a convex lens 130, is placed before or after the ray emission direction control means 250 as shown in FIG. 55, the ray emission directions will be gathered in the central area, thereby broadening the range C that both the rays from the point a and the rays from the point b reach.

Figure 56:
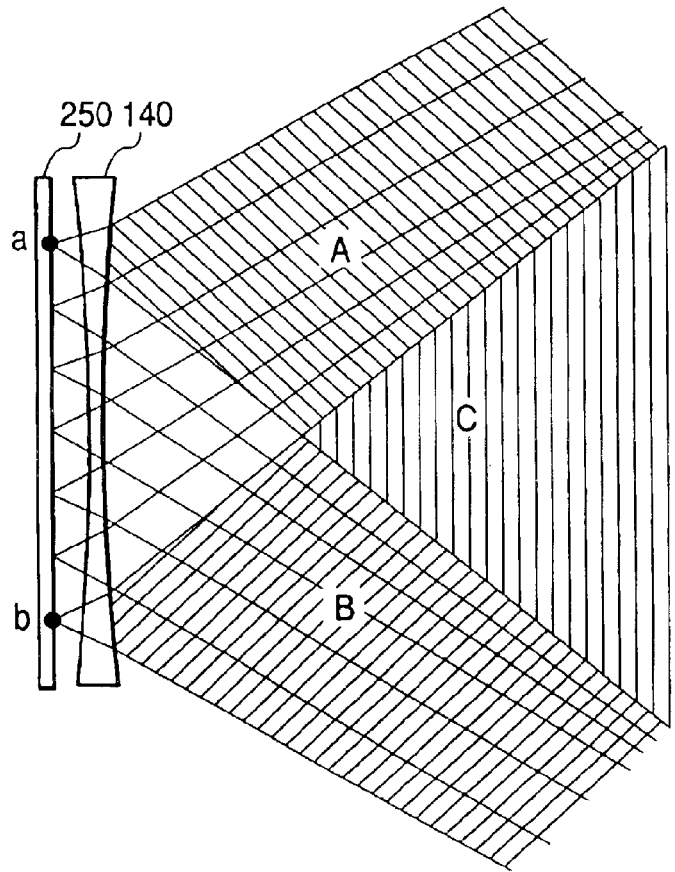
FIG. 56 is an explanatory drawing to illustrate the ray emission direction control means of FIG. 40.

When a concave lens 140 is placed before or after the ray emission direction control means 250 as shown in FIG. 56, the range of ray emission direction is expanded so as to broaden the observation area.

FIG. 57 is an explanatory drawing to illustrate an arrangement for increasing the speed of light source driving of the light source array 150 and the speed of generation of reconstructed image data by the combinational structure of the apparatus with observer's head position detecting means 155, 160.

In the drawing, numeral 160 designates an image processing portion for detecting the position of the head of observer A, which analyzes a stereoscopic image obtained by stereo camera 155 and detects the position of the head of observer A. The data of the head position is sent to light source array control means 45. Once the position of the head of observer A is specified, the rays for image reconstruction can be emitted only into the head existing region. Therefore, the light source array control means 45 can limit the on region of the light source array 150 to the narrow range. This decreases the computational complexity for generation of reconstructed image data and also narrows the range of drive of the light source portions of the light source array, thus increasing the driving speed of the light source array.

As described above, the present invention of the second aspect can achieve the 3D image reconstructing apparatus that can assure the wide observation area of predetermined 3D image in the 3D space, that can quickly reconstruct the large 3D image with high accuracy, and that permits the observer to observe the good 3D image, by setting the components as described above.

What is claimed is:

1. A three-dimensional image reconstructing apparatus for reconstructing a three-dimensional image and permitting said three-dimensional image to be recognized as an image in a three-dimensional space at an eye of an observer, said apparatus comprising:

image display means for displaying image information, spatial light modulating means for forming a fine aperture to emit light beams from said image display means; and control means for adjusting the beams from the fine aperture of said spatial light modulating means to a desired direction every moment by controlling said image display means and said spatial light modulating means so as to represent a predetermined point in a three-dimensional space, wherein, within a fixed period, the beams reach a pupil of an eye of the observer through the predetermined point in a three-dimensional space while keeping a distance between two closest beams among the beams at an eye of an observer to be a distance of not more than a diameter of the pupil of the observer.

2. A three-dimensional image reconstructing apparatus according to claim 1, wherein the distance between the two closest beams reaching said observation position is determined to be not more than 2 mm.

3. A three-dimensional image reconstructing apparatus according to claim 1, wherein a configuration of the spatial light modulating means is determined so that a maximum diameter of beams outgoing through the fine aperture of said spatial light modulating means and said optical system becomes not more than the diameter of the pupil of the observer.

4. A three-dimensional image reconstructing apparatus according to claim 1, wherein a configuration of the spatial light modulating means is determined so that a maximum diameter of beams outgoing through the fine aperture of said spatial light modulating means and said optical system becomes not more than 2 mm.

5. A three-dimensional image reconstructing apparatus according to claim 3, wherein a configuration of the spatial light modulating means is determined so that a maximum diameter of beams outgoing through the fine aperture of said spatial light modulating means and said optical system becomes not more than 2 mm.

6. A three-dimensional image reconstructing apparatus according to claim 1, wherein said control means controls the spatial light modulating means so that only a vertical length of the fine aperture of said spatial light modulating means becomes equal to a vertical length of an entire area of the spatial light modulating means.

7. A three-dimensional image reconstructing apparatus according to claim 3, wherein said control means controls the spatial light modulating means so that only a vertical length of the fine aperture of said spatial light modulating means becomes equal to a vertical length of an entire area of the spatial light modulating means.

8. A three-dimensional image reconstructing apparatus according to claim 1, wherein said control means controls the fine aperture of said spatial light modulating means so as to move the fine aperture throughout an entire area of the spatial light modulating means without duplication within said fixed period.

9. A three-dimensional image reconstructing apparatus according to claim 1, wherein said fixed period is shorter than a permissible time of afterimage of the observer.

10. A three-dimensional image reconstructing apparatus according to claim 1, wherein said fixed period is within a range of $1/30$ to $1/60$ sec.

11. A three-dimensional image reconstructing apparatus according to claim 8, wherein said fixed period is within a range of $1/30$ to $1/60$ sec.

12. A three-dimensional image reconstructing apparatus according to claim 1, wherein said image information is equal to image information obtained when the three-dimensional image to be reconstructed is reversely projected onto an image display surface of said image display means through said spatial light modulating means and said optical system.

13. A three-dimensional image reconstructing apparatus according to claim 1, wherein each of said spatial light modulating means, said optical system, and said image display means is divided into plural areas, the optical system is arranged so that the divisional areas have respective optical axes different from each other, the spatial light modulating means is arranged so that a single fine aperture is formed in every area, and the image display means is arranged so that image information is displayed in every area.

14. A three-dimensional image reconstructing apparatus according to claim 13, wherein a light-intercepting partition is provided in a space between said image display means and said optical system so that light forming the image information displayed in each of the plural divisional areas of said image display means is incident to only a corresponding area of said optical system.

15. A three-dimensional image reconstructing apparatus according to claim 1, wherein said control means controls existing ranges of said image information and the fine aperture of said spatial light modulating means so as to achieve directivity toward the predetermined point in said three-dimensional space as viewed from said observation position.

16. A three-dimensional image reconstructing apparatus according to claim 1, wherein said control means performs a hidden-surface process of the reconstructed image by such a control that when one beam outgoing through the fine aperture of said spatial light modulating means and said optical system passes plural points on the reconstructed image in said three-dimensional space, the predetermined point in said three-dimensional space becomes a farthest point from the fine aperture.

17. A three-dimensional image reconstructing apparatus according to claim 1, wherein a refracting member is provided on the light incidence side or on the light emergence side of said spatial light modulating means.

18. A three-dimensional image reconstructing apparatus according to claim 1, wherein said control means comprises reversing means for reversing the image information.

19. A three-dimensional image reconstructing apparatus according to claim 1, wherein said spatial light modulating means is comprised of a transmission type liquid-crystal display device.

20. A three-dimensional image reconstructing apparatus according to claim 1, wherein said spatial light modulating means is located closer to the observer than said image display means.

21. A three-dimensional object information input apparatus wherein the image display means of the three-dimensional image reconstructing apparatus as set forth in either one of claims 1, 2 and 3 to 20 is replaced by image pickup means, said three-dimensional object information input apparatus being arranged to achieve time-series input of image information projected onto the image pickup means and position information of the fine aperture at that time while controlling the position of the fine aperture of said spatial light modulating means in the same manner as in the three-dimensional image reconstructing apparatus.

22. A three-dimensional object information input apparatus according to claim 21, wherein said image pickup means comprises image reversing means.

23. A three-dimensional image reconstructing apparatus for reconstructing a three-dimensional image and permitting the three-dimensional image to be recognized as an image in a three-dimensional space at an eye of an observer, said apparatus comprising:

a light source array in which a plurality of light source portions for radiating beams with single directivity in a predetermined direction are arrayed, ray emission direction control means for deflecting beams from the plural light source portions of the light source array independently of each other, and control means for adjusting the beams from said ray emission direction control means to a desired direction every moment by controlling said plural light source portions and said ray emission direction control means to represent a predetermined point in a three-dimensional space, wherein, within a fixed period, the beams reach a pupil of an eye of the observer through the predetermined point in a three dimensional space while keeping a distance between two closest beams among the beams at an eye of an observer to be a distance of not more than a diameter of the pupil of the observer.

24. A three-dimensional image reconstructing apparatus according to claim 23, wherein said control means keeps the distance between the two closest beams reaching said observation position, not more than 2 mm.

25. A three-dimensional image reconstructing apparatus according to claim 23, wherein said fixed unit period is shorter than a permissible time of afterimage of the observer.

26. A three-dimensional image reconstructing apparatus according to claim 23, wherein said fixed unit period is within a range of 1/30 to 1/60 sec.

27. A three-dimensional image reconstructing apparatus according to claim 25, wherein said fixed unit period is within a range of 1/30 to 1/60 sec.

28. A three-dimensional image reconstructing apparatus according to claim 23, wherein said ray emission direction control means has a vibratory microlens array.

29. A three-dimensional image reconstructing apparatus according to claim 23, wherein emission directions of beams emitted from the ray emission direction control means are controlled by relative vibration between said light source array and said ray emission direction control means.

30. A three-dimensional image reconstructing apparatus according to claim 29, wherein the relative vibration between said light source array and said ray emission direction control means is a zigzag motion.

31. A three-dimensional image reconstructing apparatus according to claim 23, wherein said light source portion has a radiating portion and a collimator lens for condensing rays from said radiating portion and for emitting the beams in the form of parallel light.

32. A three-dimensional image reconstructing apparatus according to claim 23, wherein a telecentric system for making principal rays from the plural light source portions of the light source array outgoing in the form of nearly parallel light is provided on the light emission side of said light source array.

33. A three-dimensional image reconstructing apparatus according to claim 28, wherein said microlens array has a thickwise cross section comprised of a continuous wave shape.

34. A three-dimensional image reconstructing apparatus according to claim 23, wherein beams from said 25 predetermined point when observed from said observation position are provided with directivity by controlling radiating states of light source portions within a predetermined area out of the plural light source portions of said light source array.

35. A three-dimensional image reconstructing apparatus according to claim 23, wherein said control means performs a hidden-surface process of the reconstructed image so that when one beam from said light source portion passes plural points on the reconstructed image in said three-dimensional space, the predetermined point in the three-dimensional space when observed from said observation position becomes a farthest point from said ray emission direction control means among the plural points.

36. A three-dimensional image reconstructing apparatus according to claim 23, wherein a refracting member is provided on the light incidence side or on the light emergence side of said ray emission direction control means.

37. A three-dimensional image reconstructing apparatus according to claim 1, further comprising an optical system disposed near said spatial light modulating means.

* * * * *

UNITED STATES PATENT AND TRADEMARK OFFICE
CERTIFICATE OF CORRECTION

PATENT NO. : 6,798,390 B1
DATED : September 28, 2004
INVENTOR(S) : Toshiyuki Sudo et al.

It is certified that error appears in the above-identified patent and that said Letters Patent is hereby corrected as shown below:

Drawings,
Sheet 31, FIG. 57, "OOUTGOING" should read -- OUTGOING --.

Column 6,
Line 13, "rays" should read -- rays emerging from different appertures --.

Column 12,
Line 12, "the both" should read -- both the --.
Line 64, "place on the both" should read -- placed on both the --.

Column 13,
Line 63, "elongate" should read -- elongated --.

Column 15,
Line 16, "these" should read -- this --.

Column 18,
Line 24, "$v=(\alpha-\chi, \beta-y\gamma)$" should read -- $v=(\alpha-\chi, \beta-y,\gamma)$ --.

Column 19,
Line 54, "a t the" should read -- at the --.

Column 22,
Line 2, "these" should read -- this --.

Column 26,
Line 26, "said 25" should read -- said --.

Signed and Sealed this

Nineteenth Day of April, 2005

JON W. DUDAS
*Director of the United States Patent and Trademark Office*